United States Patent
Maan et al.

(10) Patent No.: US 12,528,400 B2
(45) Date of Patent: Jan. 20, 2026

(54) MOBILE FULFILLMENT CONTAINER APPARATUS, SYSTEMS, AND RELATED METHODS

(71) Applicant: Shopify Inc., Ottawa (CA)

(72) Inventors: Daanish Maan, Brampton (CA); Michael Joseph DeFazio, Fonthill (CA); Jonathan Kim, Toronto (CA); Andrew Ferrier, Montreal (CA); David Waddell, Nelson (CA); Silvana Zaldivar, Toronto (CA)

(73) Assignee: Shopify Inc, Ottawa (CA)

( * ) Notice: Subject to any disclaimer, the term of this patent is extended or adjusted under 35 U.S.C. 154(b) by 394 days.

(21) Appl. No.: 17/716,676

(22) Filed: Apr. 8, 2022

(65) Prior Publication Data

US 2023/0322145 A1  Oct. 12, 2023

(51) Int. Cl.
| | |
|---|---|
| B60P 3/00 | (2006.01) |
| B25J 19/02 | (2006.01) |
| G05D 1/00 | (2024.01) |
| G06Q 10/0832 | (2023.01) |
| G06Q 10/0835 | (2023.01) |
| G07C 9/22 | (2020.01) |

(52) U.S. Cl.
CPC ............. B60P 3/007 (2013.01); B25J 19/023 (2013.01); G05D 1/0088 (2013.01); G06Q 10/0832 (2013.01); G06Q 10/0835 (2013.01); G07C 9/22 (2020.01)

(58) Field of Classification Search
CPC ...... B60P 3/007; B25J 19/023; G05D 1/0088; G06Q 10/0832; G06Q 10/0835; G06Q 30/0635; G06Q 30/0609; G06Q 10/083; G07C 9/22; A47G 2029/145; A47G 2029/149; A47G 29/141; H04W 4/35
See application file for complete search history.

(56) References Cited

U.S. PATENT DOCUMENTS

| | | | |
|---|---|---|---|
| 9,834,380 B2 | 12/2017 | Hamilton et al. | |
| 10,303,171 B1 * | 5/2019 | Brady | G05D 1/0088 |
| (Continued) | | | |

FOREIGN PATENT DOCUMENTS

| | | |
|---|---|---|
| CN | 112722675 A | 4/2021 |
| JP | 2008123278 A | 5/2008 |
| JP | 2019139371 A | 8/2019 |

OTHER PUBLICATIONS

United States Patent and Trademark Office, "Non-Final Office Action," issued in connection with U.S. Appl. No. 17/716,684, dated Jul. 11, 2024, 32 pages.

(Continued)

Primary Examiner — Adam R Mott
Assistant Examiner — Ricardo I Viscarra
(74) Attorney, Agent, or Firm — Hanley, Flight & Zimmerman, LLC

(57) ABSTRACT

Mobile fulfillment container apparatus, systems, and related methods are disclosed. An example mobile container includes a storage area to move between a locked state and an unlocked state to provide access to inventory in the storage area; an electronic gating sensor to detect when the inventory has been removed from the storage area; and processor circuitry to output an instruction including a destination for the mobile container based on an order associated with the inventory.

22 Claims, 14 Drawing Sheets

(56) References Cited

U.S. PATENT DOCUMENTS

| | | | |
|---|---|---|---|
| 10,535,053 B2* | 1/2020 | Wilkinson | G06Q 20/407 |
| 2005/0061615 A1 | 3/2005 | Berdelle-Hilge | |
| 2007/0150375 A1 | 6/2007 | Yang | |
| 2007/0267482 A1 | 11/2007 | Ruckart et al. | |
| 2010/0100315 A1 | 4/2010 | Davidson et al. | |
| 2015/0269521 A1 | 9/2015 | Knapp et al. | |
| 2016/0170576 A1 | 6/2016 | Brown | |
| 2017/0169413 A1 | 6/2017 | Holmes et al. | |
| 2017/0330144 A1 | 11/2017 | Wakim et al. | |
| 2018/0024554 A1 | 1/2018 | Brady et al. | |
| 2018/0025408 A1 | 1/2018 | Xu et al. | |
| 2019/0026688 A1 | 1/2019 | Liu et al. | |
| 2019/0043001 A1 | 2/2019 | Woulfe et al. | |
| 2019/0242715 A1 | 8/2019 | Ikeda et al. | |
| 2020/0065748 A1* | 2/2020 | Durkee | G06Q 30/0639 |
| 2020/0311788 A1* | 10/2020 | Steiner | G06Q 30/0635 |
| 2020/0320471 A1 | 10/2020 | Rajkhowa et al. | |
| 2021/0254988 A1 | 8/2021 | Styles et al. | |
| 2021/0256472 A1* | 8/2021 | Javidan | H04W 4/025 |
| 2021/0387808 A1* | 12/2021 | Kalouche | G06Q 10/083 |
| 2022/0092541 A1 | 3/2022 | Cacioppo et al. | |
| 2022/0141621 A1 | 5/2022 | Shah et al. | |
| 2022/0179416 A1 | 6/2022 | Cacioppo | |
| 2022/0250844 A1 | 8/2022 | Kreis et al. | |
| 2022/0291694 A1 | 9/2022 | Barabas | |
| 2022/0391813 A1 | 12/2022 | Walet et al. | |
| 2023/0109611 A1* | 4/2023 | Noh | G06Q 30/0601 705/26.1 |
| 2023/0322145 A1* | 10/2023 | Maan | G06Q 10/0832 700/245 |
| 2023/0322491 A1 | 10/2023 | Yifan | |

OTHER PUBLICATIONS

United States Patent and Trademark Office, "Final Office Action," issued in connection with U.S. Appl. No. 17/716,684, dated Feb. 7, 2025, 59 pages.

United States Patent and Trademark Office, "Non-Final Office Action," issued in connection with U.S. Appl. No. 17/716,684, dated May 9, 2025, 57 pages.

Mende, Martin; Scott, Maura L.; van Doorn, Jenny; Grewal, Dhruv; Shanks, Ilana, "Service Robots Rising: How Humanoid Robots Influence Service Experiences and Elicit Compensatory Consumer Responses," 2019, American Marketing Association, vol. 56(4), pp. 535-556. (Year: 2019).

United States Patent and Trademark Office, "Notice of Allowance and Fee(s) Due," issued in connection with U.S. Appl. No. 17/716,684, dated Sep. 16, 2025, 7 pages.

\* cited by examiner

MOBILE FULFILLMENT CONTAINER APPARATUS, SYSTEMS, AND RELATED METHODS

FIELD OF THE DISCLOSURE

This disclosure relates generally to electronic order fulfillment and, more particularly, to mobile fulfillment container apparatus, systems, and related methods.

BACKGROUND

An individual may purchase goods by submitting an order via, for instance, an online store associated with a merchant (e.g., a retailer, a seller, or other provider of goods). Fulfillment lockers may be located at various locations in an environment (e.g., a city, a neighborhood) to enable the individual to retrieve the content(s) of the order from one of the lockers rather than, for instance, waiting for the order to be shipped to the individual's home.

BRIEF DESCRIPTION OF THE DRAWINGS

In general, the same reference numbers will be used throughout the drawing(s) and accompanying written description to refer to the same or like parts. The figures are not to scale.

Figure 1:
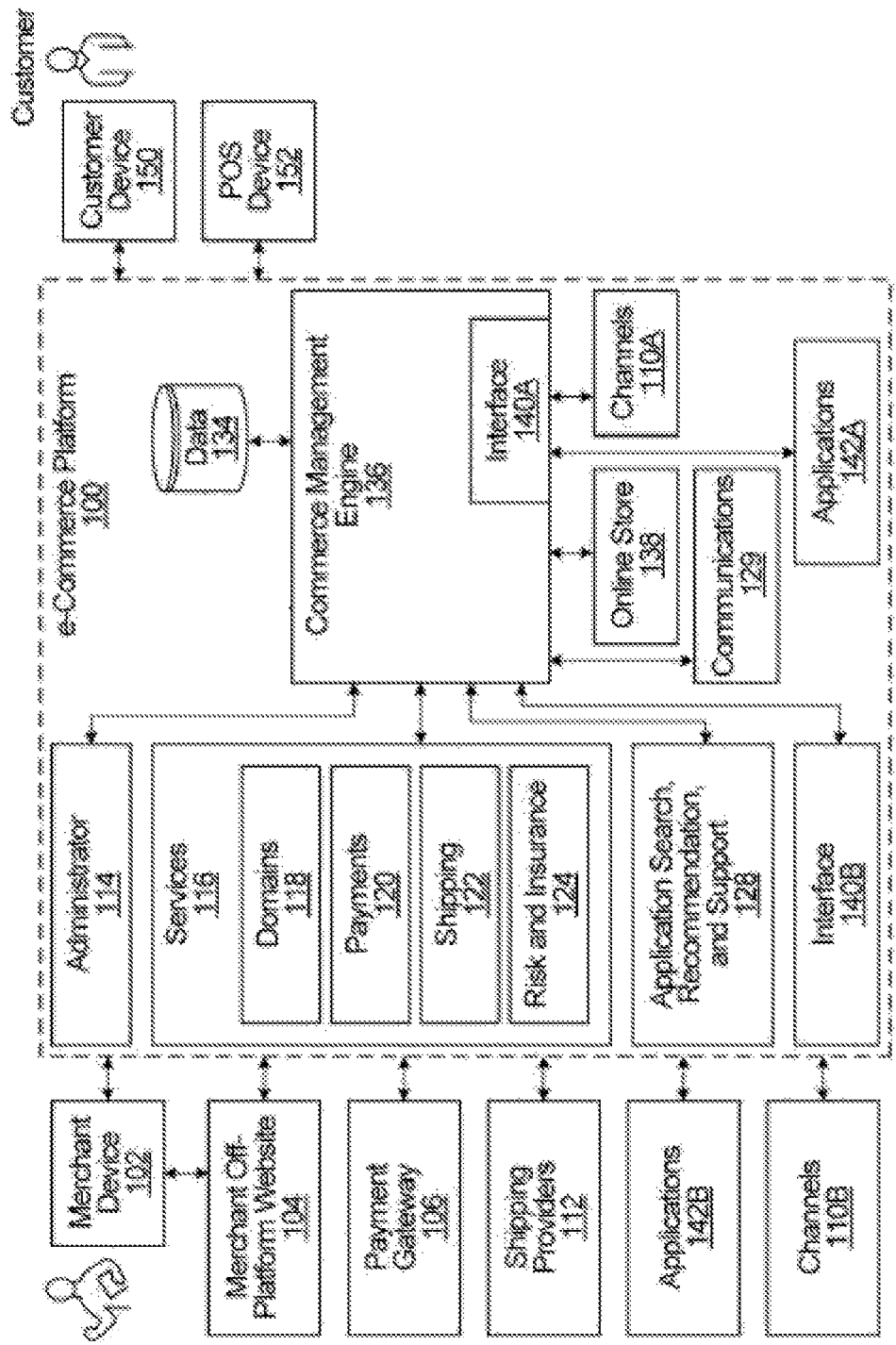
FIG. 1 is a block diagram of an example e-commerce platform

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An individual may purchase goods from a merchant (e.g., a retailer) by submitting an order via, for instance, an online store associated with the merchant or other seller. In some instances, the order is shipped to a location associated with the user, such as the user's home.

Disclosed herein are example apparatus, systems, and methods that provide for mobile fulfillment of ordered goods. Examples disclosed herein include a mobile fulfillment container (also referred to herein as a mobile container, a container) that can be moved and/or transported between one or more locations based on variables such as demand for inventory carried by the mobile container, designated geographical destinations for the container, etc. Example mobile containers disclosed herein can include a self-driving vehicle, a manual pushcart, a trailer, etc. Example mobile containers disclosed herein can be stocked (e.g., pre-stocked) with inventory and, in response to an order for the inventory in the container, can move or be transported to a particular location based on instructions generated by a mobile container control circuitry to enable the purchaser to retrieve the ordered good(s) at the location.

Examples disclosed herein dynamically determine a location or destination (e.g., an optimal location) for the mobile container. Some examples disclosed herein determine a time for which the container to remain at the location. To determine the location for the mobile container and/or the time for which the container is to remain at the location, examples disclosed herein evaluate factors such as a current location of the container; a number of orders received for inventory associated with the container; a number of orders that have been retrieved by users from the container; a number of orders remaining to be retrieved, location(s) of other mobile container(s) with the same, similar, or different inventory, etc.

Examples disclosed herein selectively provide access to inventory in the mobile container by, for instance, enabling a user to retrieve the goods from a portion of the storage area or outputting the goods via, for instance, a robotic arm. Examples disclosed herein can authenticate a user to permit access to the inventory based on, for example, order information provided by the user. Example mobile containers disclosed herein can monitor for unauthorized access to one or more goods in the inventory by a user who is retrieving inventory from the container via, for instance, radio frequency identification (RFID) monitoring. Some example mobile containers enable users to retrieve additional inventory from the container in addition to the inventory ordered by initiating payment for the additional good(s) after the user has selected the additional good(s).

Examples disclosed herein monitor demand for inventory of the mobile container(s), which can be used to selectively stock the container(s) with particular goods, adjust location(s) of the container(s) in the environment, etc. In some examples disclosed herein, the mobile container(s) are filled with the goods prior to receiving order(s) to provide for on-demand shopping and order fulfillment.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme—specific settings such as, for example, settings as may change aspects of a given theme, such as, for example, specific colors, fonts, and pre—built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an online business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
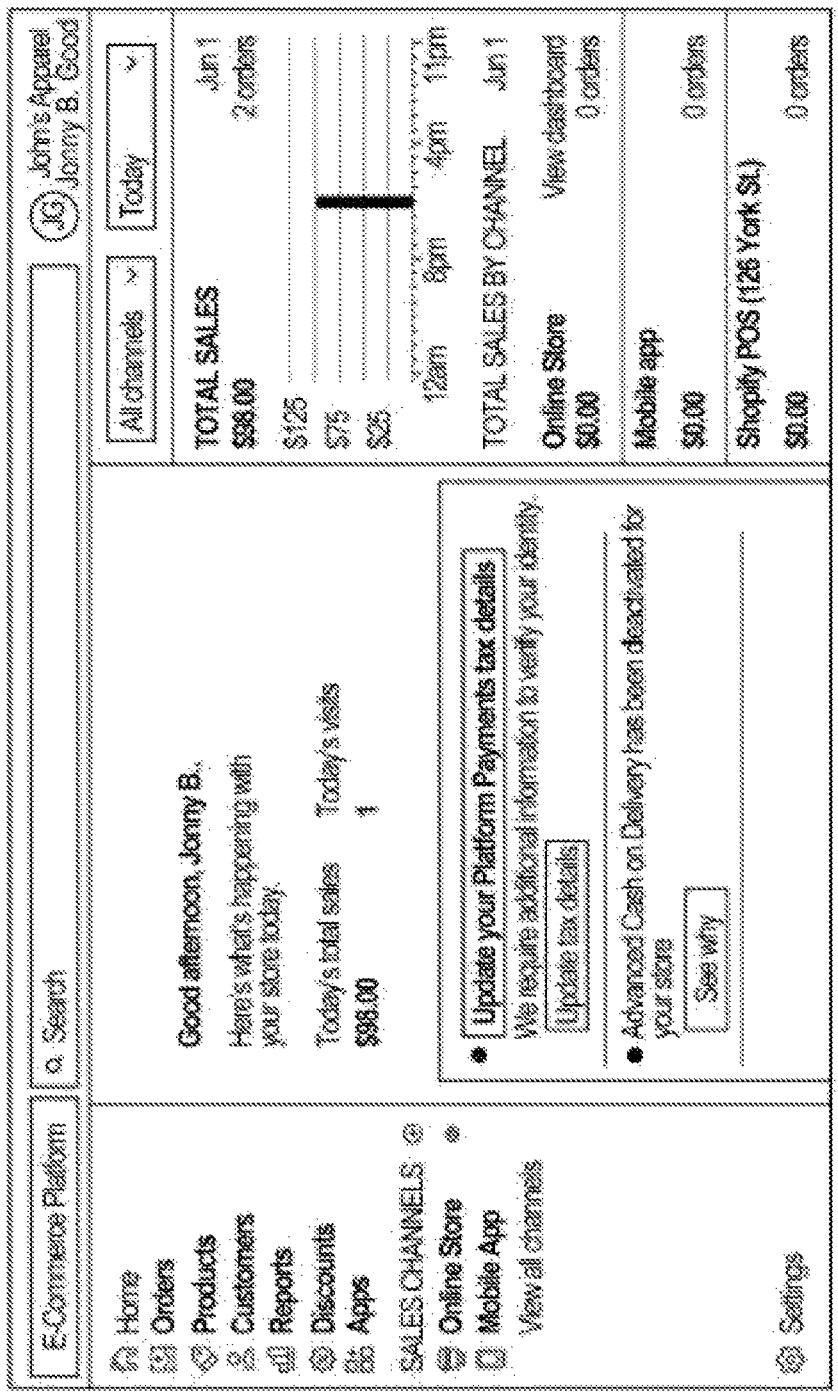
FIG. 2 is an illustration of an example home page of an administrator of the e-commerce platform of FIG. 1.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 3:
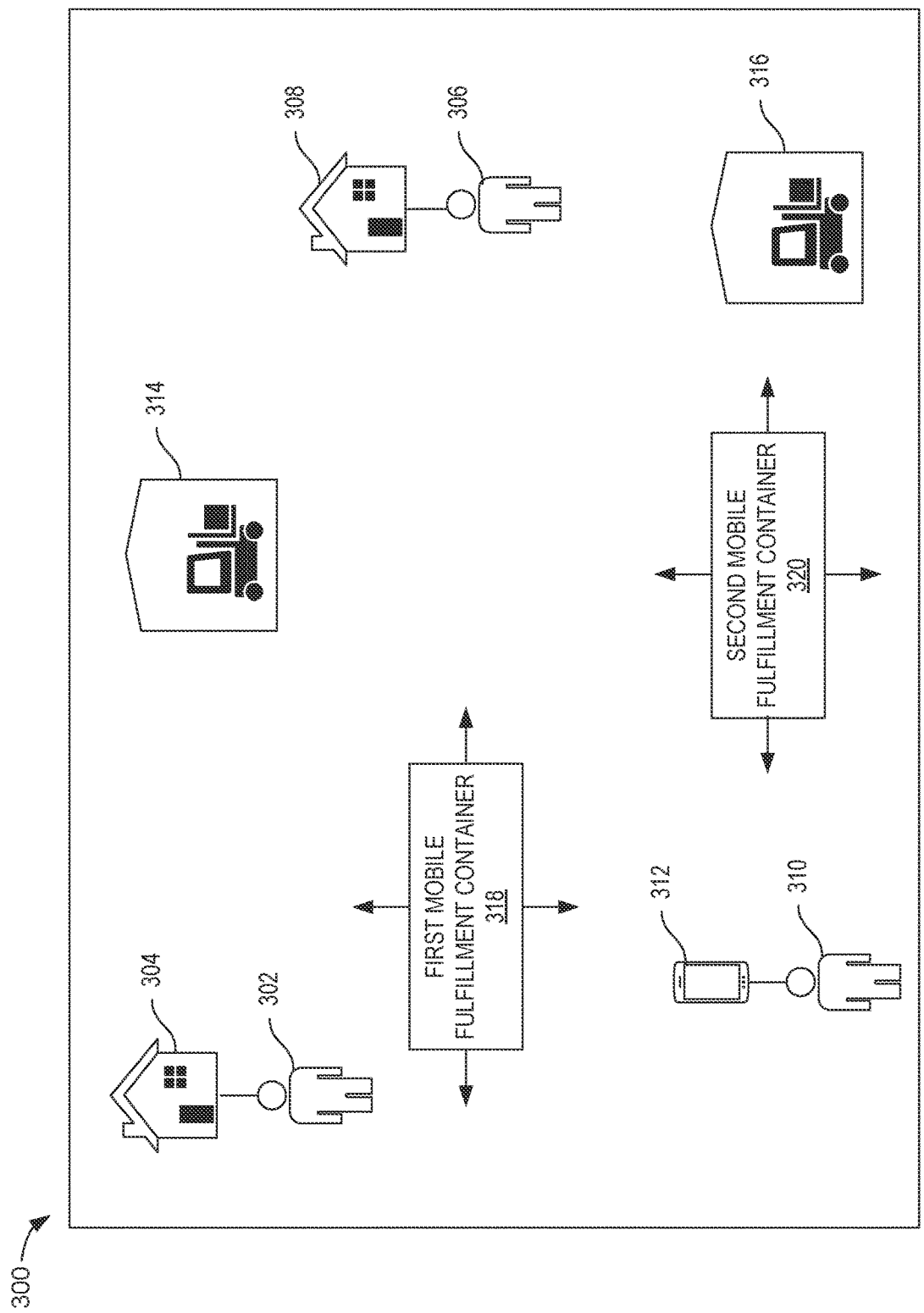
FIG. 3 illustrates an example environment including one or more mobile fulfillment containers in accordance with teachings of this disclosure.

FIG. 3 illustrates an example environment 300 in which example mobile fulfillment containers disclosed herein may be implemented. The example environment 300 of FIG. 3 can be a city, a neighborhood, etc. As illustrated in FIG. 3, at a given time, a first user 302 (e.g., a consumer) is located at a first house 304 in the environment 300. A second user 306 (e.g., a consumer) is located at a second house 308 in the environment 300. A third user 310 (e.g., a consumer) is located in the environment 300 and has access to a mobile device 312 (e.g., a smartphone) while in the environment 300. As shown in FIG. 1, each of the users 302, 306, 310 are located at different locations in the environment 300. Additional or fewer users can be located in the environment 300 at a given time (e.g., hundreds of users, thousands of users). Also, the example environment 300 can include additional or fewer houses than shown in FIG. 3.

The example environment 300 includes a first warehouse 314 and a second warehouse 316. The first warehouse 314 stores inventory (e.g., product(s)) for one or more merchants (e.g., retailer(s), seller(s), or other provider(s)). The second warehouse 316 stores inventory for one or more merchant(s). The inventory stored at the second warehouse 316 can be the same or different inventory than the inventory stored at the first warehouse 314. The inventory stored at the second warehouse 316 can be associated with the same or different merchant(s) than the inventory stored at the first warehouse 314. The example environment 300 can include additional or fewer warehouses than shown in FIG. 3.

In the example of FIG. 3, one or more of the users 302, 306, 310 can place an order from a merchant via an online store (e.g., the online store 138 of FIG. 1) and/or via an application (e.g., the applications 142A-B) using a customer device (e.g., computer, laptop computer, mobile computing device, a smartphone, or other customer device 150 of FIG. 1). For instance, the first user 302 may place an order for one or more products via a computer at the first house 304. The third user 310 may place an order for one or more products via the mobile device 312.

The example environment 300 includes one or more mobile fulfillment containers from which the user(s) 302, 306, 310 can retrieve the product(s) associated with the order(s) placed by the respective user(s) 302, 306, 310. The example environment 300 includes a first mobile fulfillment container 318 and a second mobile fulfillment container 320. The example environment 300 can include additional or fewer mobile fulfillment containers 318, 320 than shown in FIG. 3 (e.g., one mobile fulfillment container, twenty mobile fulfillment containers, etc.). The number of mobile fulfillment containers 318, 320 in the environment 300 can be based on, for instance, a size of the environment 300; a number of orders placed by the users 302, 306, 310 in the environment 300; etc.

Each of the first mobile fulfillment container 318 and the second mobile fulfillment container 320 includes a storage area to carry inventory. The first mobile fulfillment container 318 and/or the second mobile fulfillment container 320 can be loaded with the inventory at, for instance, one or more of the warehouses 314, 316 in the environment 300. In some examples, the inventory is arranged in the first mobile fulfillment container 318 and/or the second mobile fulfillment container 320 in a particular configuration (e.g., by product type, by merchant); in other examples, the arrangement of the inventory in the first mobile fulfillment container 318 and/or the second mobile fulfillment container 320 is random. In some examples, the first mobile fulfillment container 318 and/or the second mobile fulfillment container 320 are loaded with inventory prior to any orders being placed for the inventory. Thus, in some examples, the inventory in the first mobile fulfillment container 318 and/or the second mobile fulfillment container 320 is not associated with any particular orders.

The first mobile fulfillment container 318 and/or the second mobile fulfillment container 320 can be, for instance, an autonomous vehicle. In some examples, the first mobile fulfillment container 318 and/or the second mobile fulfillment container 320 is a remote-driven vehicle. In some examples, the first mobile fulfillment container 318 and/or the second mobile fulfillment container 320 can be coupled to or transported by a vehicle (e.g., a car, a truck). In some examples, movement of the first mobile fulfillment container 318 and/or the second mobile fulfillment container 320 is facilitated by an individual pushing the container 318, 320, pulling the container 318, 320 via a bicycle, etc.

The first mobile fulfillment container 318 and the second mobile fulfillment container 320 can move (e.g., be transported, self-drive) within the environment 300 to enable the user(s) 302, 306, 310 to retrieve the inventory stored in the container(s) 318, 320 and, thus, fulfill the order(s) placed by the user(s) 302, 306, 310. In some examples, the first mobile fulfillment container 318 and the second mobile fulfillment container 320 are at respective locations in the environment 300 (e.g., different locations in the neighborhood) prior to an order being placed by one or more of the users 302, 306, 310. As disclosed herein, the location(s) of the first mobile fulfillment container 318 and/or the second mobile fulfillment container 320 within the environment 300 can be dynamically selected based on factors including, but not limited to, for instance, the location(s) of the user(s) 302, 306, 310 who placed the order(s) (e.g., the location of the first house 304, the location of the user 310 in the environment 300 when the user 310 placed the order, etc.); the type of inventory in the respective containers 318, 320; the level of inventory in the respective containers 318, 320; current and/or predicted demand for the inventory in the respective containers 318, 320, etc. The first mobile fulfillment container 318 and/or the second mobile fulfillment container 320 can move (e.g., automatically move, be transported) to a selected destination in the environment 300 from which the user(s) 302, 306, 310 can retrieve goods in the order(s). Also, the first mobile fulfillment container 318 and/or the second mobile fulfillment container 320 can periodically return to the first warehouse 314 and/or the second warehouse 316 for additional inventory, to return and/or exchange unsold inventory, etc.

Figure 4:
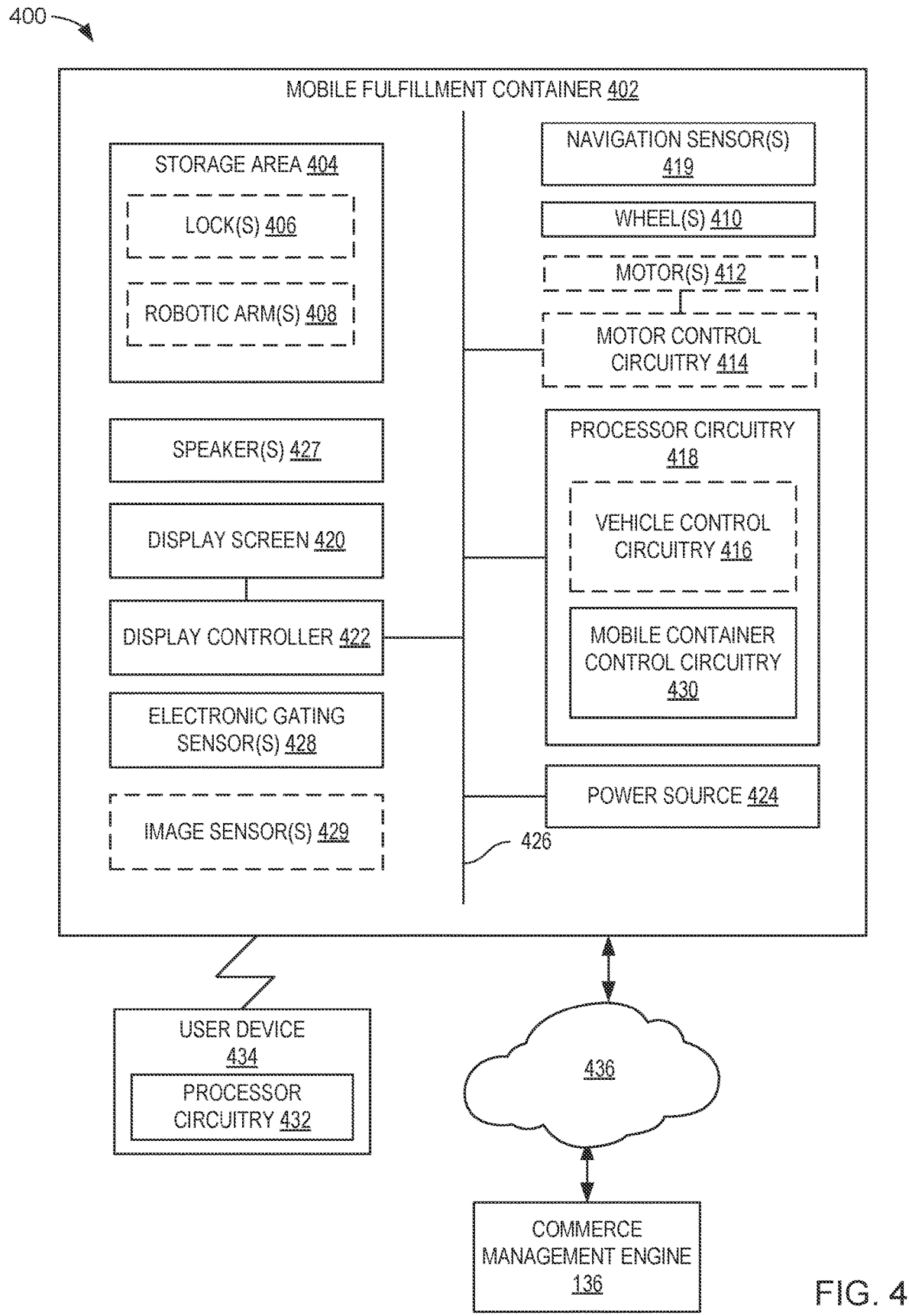
FIG. 4 illustrates an example system including an example mobile fulfillment container and example mobile container control circuitry in accordance with teachings of this disclosure.

FIG. 4 illustrates an example system 400 constructed in accordance with teachings of this disclosure for controlling a mobile fulfillment container 402 (e.g., the first mobile fulfillment container 318, the second mobile fulfillment container 320 of FIG. 3) in an environment, such as the example environment 300 of FIG. 3.

The example mobile fulfillment container 402 includes a housing or frame to support a storage area 404 of the container 402. The storage area 404 can include storage units (e.g., boxes, cubes), shelves, and/or other structures for carrying inventory (e.g., products). As disclosed herein, in some examples, one or more portions of the storage area 404 can move between a locked state and an unlocked state via locks 406 to enable users to retrieve inventory from the storage area 404, to load the storage area 404 with inventory, etc. In some examples, the mobile fulfillment container 402 includes one or more robotic arms 408 to retrieve inventory from the storage area 404 and to output the inventory for access by a user (e.g., a purchaser of the inventory). In some such examples, the user does not directly access the storage area 404 and/or portions thereof. Rather, the robotic arm(s) 408 retrieve the goods associated with the order and the output the goods via, for instance, a designated area of the mobile fulfillment container 402 (e.g., a drawer, a slot, etc.).

The mobile fulfillment container 402 of FIG. 4 includes wheels 410 to enable the mobile fulfillment container 402 to move and/or be transported between locations in the environment 300. In some examples, the mobile fulfillment container 402 is a trailer that can be transported via, for instance, a vehicle such as a car, a bicycle, and/or by individual(s) manually pushing or pulling the container 402.

In some examples, the mobile fulfillment container 402 of FIG. 4 includes one or more motors 412 (e.g., electric motor(s) and/or other drive mechanism(s)) to cause movement of the container 402 via the wheel(s) 410 of the container 402. In such examples, the mobile fulfillment container 402 includes motor control circuitry 414 (e.g., hardware and/or software components) to control, for example, a speed of the container 402.

In some examples, the mobile fulfillment container 402 is an autonomous vehicle. In such examples, the mobile fulfillment container 402 includes vehicle control circuitry 416 to control movement of the autonomous or self-driving mobile fulfillment container 402. In the example of FIG. 4, the vehicle control circuitry 416 is implemented by processor circuitry 418 of the mobile fulfillment container 402. When the mobile fulfillment container 402 is an autonomous vehicle, the container 402 moves to a location in an environment without or with limited user input control during movement of the container 402. In some examples, the mobile fulfillment container 402 is a remotely driven vehicle. In such examples, the mobile fulfillment container 402 moves to a location in an environment in response to inputs provided by a remote user.

The example mobile fulfillment container 402 includes navigation sensor(s) 419 such as, for example, motion sensor(s) (e.g., accelerometer(s)), GPS receiver(s), etc. As disclosed herein, the navigation sensor(s) 419 output signals corresponding to data that can be used to determine a location of the mobile fulfillment container 402 in the environment 300.

The example mobile fulfillment container 402 includes a display screen 420 to present data to user(s) of the container 402. In some examples, the display screen 420 is a touch screen to enable a user (e.g., the user(s) 302, 306, 310 of FIG. 1) to interact with data presented on the display screen 420 by touching the screen 420. A display controller 422 (e.g., a graphics processing unit (GPU)) of the example mobile fulfillment container 402 of FIG. 4 controls operation of the display screen 420 and facilitates rending of content (e.g., display frame(s) associated with graphical user interface(s)) via the display screen 420. The example container 402 of FIG. 4 includes a power source 424 such as a battery to provide power to the display controller 422 and other components of the container 402 communicatively coupled via a bus 426. In some examples, the mobile fulfillment container 402 includes speaker(s) 427 to provide audio output(s) to user(s) interacting with the container 402.

As disclosed herein, in some examples, the lock(s) 406 of the storage area 404 of the mobile fulfillment container 402 can be unlocked to provide access to the inventory stored in the storage area 404. The example mobile fulfillment container 402 includes one or more electronic gating sensors 428 to detect or monitor removal of goods from the storage area 404 and/or insertion of goods into the storage area 404 (e.g., to accept returns and/or exchanges of good(s)). As disclosed herein, the electronic gating sensor(s) 428 output signals corresponding to data that can be used to determine which goods have been removed from or inserted into the storage area 404, when the goods were removed or inserted, etc. In some examples, the electronic gating sensor(s) 428 includes radio frequency identification (RFID) reader(s) to detect information transmitted by RFID tags attached to the goods in the storage area 404 of the mobile fulfillment container 402.

In some examples, the mobile fulfillment container 402 includes one or more image sensor(s) 429 (e.g., video camera(s), still camera(s)) to generate image data of the environment 300 surrounding the container 402, image data of the storage area 404, etc. In some examples, the image data generated by the image sensor(s) 429 can be used to determine a location of the container 402 based on image analysis (e.g., to supplement location information obtained from the navigation sensor(s) 419). In some examples, analysis of the image data generated by the image sensor(s) 429 can be used to identify the inventory removed from the storage area 404 of the container 402. Thus, in some examples, the image sensor(s) 429 can serve as the electronic gating sensor(s) 428.

In the example of FIG. 4, mobile container control circuitry 430 determines location(s) for the mobile fulfillment container 402 in the environment 300, monitors inventory of the container 402, and/or monitors user activity with respect to user(s) who retrieve inventory from the container 402 to fulfill orders. In examples disclosed herein, the location(s) of the mobile fulfillment container 402 in the environment 300 can be dynamically selected based on, for instance, location(s) of user(s) who placed order(s) for the inventory carried by the container 402 (e.g., the locations of the house(s) 304, 308 of FIG. 3), a level of inventory in the container 402, a distance of the container 402 from a warehouse 314, 316 in the environment 300, historical demand for inventory carried by the container 402, etc. In some examples, the mobile container control circuitry 430 selects a destination or location for the mobile fulfillment container 402 to minimize a distance between the container 402 and each user who has placed an order to be retrieved from the container 402 at a particular time. For example, the mobile container control circuitry 430 can select a location in the environment 300 for the mobile fulfillment container (e.g., the first mobile fulfillment container 318 of FIG. 3) equidistant between the first house 304 and the second house 308 in response to orders placed by the first user 302 and the second user 306. In some examples, the mobile container control circuitry 430 determines the location of the mobile fulfillment container 402 based on locations and/or inventory levels of other mobile fulfillment container(s) 402 in the environment (e.g., the second mobile fulfillment container 320 of FIG. 3).

In the example of FIG. 4, the mobile container control circuitry 430 is implemented by executable instructions executed on the processor circuitry 418 of the mobile fulfillment container 402. However, in other examples, the mobile container control circuitry 430 is implemented by processor circuitry 432 of another user device 434 (e.g., a smartphone, an edge device, a wearable device, etc.) in communication with the container 402 (e.g., via wired or wireless communication protocols), and/or by a cloud-based device 436 (e.g., one or more server(s), processor(s), and/or virtual machine(s)). In other examples, one or more components of the mobile container control circuitry 430 is implemented by dedicated circuitry located on the mobile fulfillment container 402 and/or the user device 434. These components may be implemented in software, hardware, or in any combination of two or more of software, firmware, and/or hardware.

The mobile container control circuitry 430 of FIG. 4 is in communication with the commerce management engine 136. In response to an order (e.g., via the online store 138 of FIG. 1, the applications 142A-B of FIG. 1) for inventory, the mobile container control circuitry 430 selects one of or more of the mobile fulfillment containers 402 in the environment 300 to fulfill the order. The mobile container control circuitry 430 selects the mobile fulfillment container(s) 402 based on, for example, the inventory in the container(s) 402, respective location(s) of the container(s) 402, etc. The mobile container control circuitry 430 determines a destination (i.e., an optimal destination) for the selected mobile fulfillment container 402 based on, for example, the location of the user who placed the order, the location(s) of other user(s) who placed orders for inventory in the container 402 that have not yet been retrieved from the container 402, etc. In some examples, the mobile container control circuitry 430 determines a route for the mobile fulfillment container 402 to travel to reach the destination.

When the mobile fulfillment container 402 has arrived at the destination selected by the mobile container control circuitry 430, the mobile container control circuitry 430 monitors user activity with respect to the container 402 and/or the inventory therein. For instance, the mobile container control circuitry 430 can authenticate a user who has placed an order based on, for instance, user input(s) (e.g., an order confirmation number) received via the display screen 420 of the container 402 and/or a user application on user device (e.g., the customer device 150 of FIG. 1, the user device 434) such as a smartphone. In response to authentication of the user, the mobile container control circuitry 430 provides access to the inventory in the storage area 404. In some examples, the mobile container control circuitry 430 causes the locks(s) 406 of the storage area 404 to move to the unlocked state. In some examples, the mobile container control circuitry 430 can cause the robotic arm(s) 408 to retrieve the inventory associated with the order.

In examples in which the user retrieves the inventory from the unlocked storage area 404, the example mobile container control circuitry 430 monitors the content removed from the storage area 404 based on data associated with the electronic gating sensors 428 (e.g., RFID detector(s), the image sensor (s) 429). In some examples, the mobile container control circuitry 430 can cause alerts to be output via the speaker(s) 427, the display screen 420, and/or the user's device (e.g., the customer device 150) in response to a determination that goods that were not part of a particular order were removed from the storage area 404. In some examples, the mobile container control circuitry 430 automatically initiates payment for the goods that were not in the order via, for instance, a credit card associated with the order. In some examples, the mobile container control circuitry 430 causes the storage area 404 to move from the unlocked state to the locked state after a particular threshold of time, after determining that an order has been fulfilled, etc.

The mobile container control circuitry 430 monitors the inventory in the mobile fulfillment container 402 over time to determine for instance, the inventory remaining in the storage area 404, whether the container 402 should return to the warehouse 314, 316 in the environment 300, etc. The mobile container control circuitry 430 dynamically determines whether the location of the mobile fulfillment container 402 should be adjusted based on, for instance, additional orders received for inventory in the container 402, the status of previously placed orders, the inventory level of the container 402 and/or other statuses of other mobile fulfillment containers 402 in the environment, etc.

Figure 5:
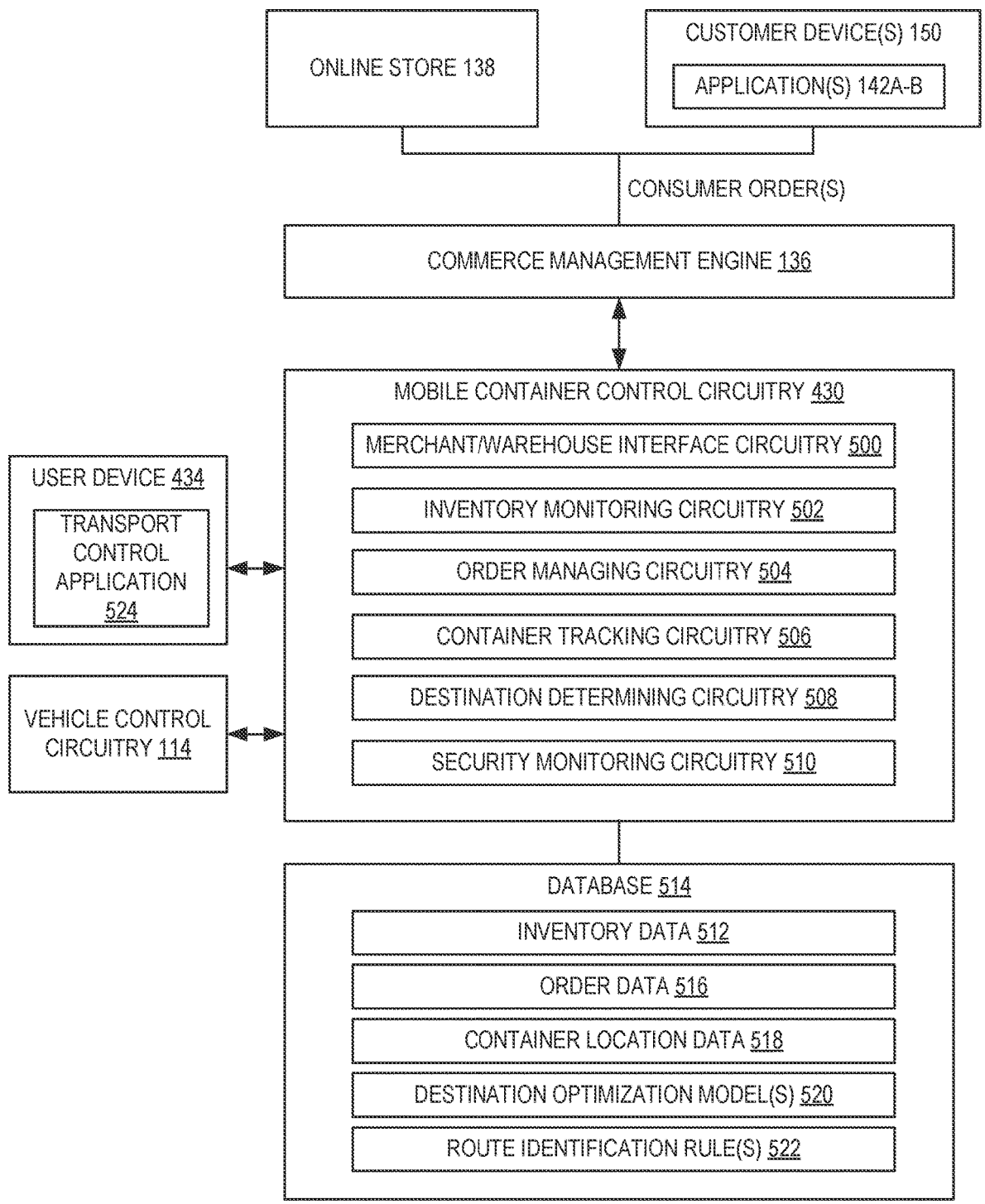
FIG. 5 is a block diagram of an example implementation of the mobile container control circuitry of FIG. 4.

FIG. 5 is a block diagram of an example implementation of the mobile container control circuitry 430 of FIG. 4 to manage one or more mobile fulfillment containers 402 in an environment such as the example environment 300 of FIG. 3. The mobile container control circuitry 430 of FIG. 5 may be instantiated (e.g., creating an instance of, bring into being for any length of time, materialize, implement, etc.) by processor circuitry such as a central processing unit executing instructions. Additionally or alternatively, the mobile container control circuitry 430 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by one or more virtual machines and/or containers executing on the microprocessor.

The example mobile container control circuitry 430 of FIG. 5 includes example merchant/warehouse interface circuitry 500, example inventory monitoring circuitry 502, example order managing circuitry 504, example container tracking circuitry 506, example destination determining circuitry 508, and example security monitoring circuitry 510. In some examples, one or more components of the mobile container control circuitry 430 is implemented by the processor circuitry 418 of the mobile fulfillment container 402 and one or more other components of the mobile container control circuitry 430 is implemented by the user device 434 and/or the cloud-based device(s) 436.

The merchant/warehouse interface circuitry 500 of the example mobile container control circuitry 430 facilitates communication with the commerce management engine 136 (e.g., via wired or wireless communication protocol(s)) associated with one or more merchants and/or warehouses. In some examples, the merchant/warehouse interface circuitry 500 receives data from the commerce merchant engine 136 indicating that, for instance, order(s) have been placed for good(s) associated with the merchant or the warehouse and stored in the mobile fulfillment container(s) 402. The order(s) can be placed by consumers via, for instance, the online store 138 of FIG. 1, the application(s) 142A-B via the customer device(s) 150, etc.

The inventory monitoring circuitry 502 of the example mobile container control circuitry 430 tracks the inventory in the mobile fulfillment container(s) 402 over time. In some examples, the inventory monitoring circuitry 502 monitors the inventory based on user inputs indicating the goods stored in the mobile fulfillment container(s) 402 when the container(s) 402 are stocked at the warehouse 314, 316 of FIG. 3. In some examples, the user input(s) can indicate a portion of the storage area 404 of the container in which the good(s) were loaded (e.g., a particular storage unit in the storage area 404). In some examples, the inventory monitoring circuitry 502 detects changes in the inventory level(s) of the mobile fulfillment container(s) 402 based on order(s) received for good(s) in the mobile fulfillment container(s) 402 (e.g., as received from the commerce management engine 136 via the merchant/warehouse interface circuitry 500), good(s) retrieved from the mobile fulfillment container(s) 402, good(s) returned to or exchanged at mobile fulfillment container(s) 402, etc. In some examples, the inventory monitoring circuitry 502 detects changes in the inventory levels of the mobile fulfillment container(s) 402 based on the removal and/or insertion of goods from the storage unit 404 of the respective container(s) 402 as detected by the electronic gating sensor(s) 428 (e.g., RFID tags associated with the respective goods).

Based on the level(s) of inventory in the mobile fulfillment container(s) 402 at a given time, the example inventory monitoring circuitry 502 outputs reports and/or alerts that are transmitted to the commerce management engine 136 (e.g., via the merchant/warehouse interface circuitry 500). The report(s) and/or alert(s) can be analyzed by, for instance, the merchant(s) with respect to stocking the inventory of the mobile fulfillment container(s) 402. As disclosed herein, the reports and/or alerts generated by the inventory monitoring circuitry 502 can be used by the order managing circuitry 504 to determine whether the mobile fulfillment container(s) 402 can be used to fulfill particular orders, whether the container(s) 402 should be returned to the warehouse 314, 316 of FIG. 3, etc. In examples in which the mobile fulfillment container 402 is an autonomous vehicle, the alerts generated by the inventory monitoring circuitry 502 indicating that inventory levels in the container(s) 402 do not meet a threshold (which may be predefined, configured based on user input, adaptive, etc.) can cause (e.g., automatically cause) the autonomous vehicle to return to the warehouse 314, 316.

In some examples, the inventory monitoring circuitry 502 can generate reports indicating the current, unordered inventory in the mobile fulfillment container(s) 402 at a given time. The reports can be output via the merchant/warehouse interface circuitry 500 to broadcast the inventory levels in the mobile fulfillment container(s) 402 via, for instance, the online store 138, the application(s) 142A-B accessed via the customer device(s) 150, etc. Such reports can inform, for instance, users (e.g., the user(s) 302, 306, 310 of FIG. 3) in the proximity to the current location of the mobile fulfillment container(s) 402 of the goods available for purchase in the container(s) 402.

The inventory monitoring circuitry 502 can determine demand and/or historical trends for particular goods based on the inventory levels in mobile fulfillment container(s) 402 in the environment 300 over time. In some examples, the inventory monitoring circuitry 502 can generate predictions for future demand (e.g., daily demand, seasonal demand, etc.) of inventory based on the historical demand. Such information can be used by warehouse owners and/or merchants to determine the goods to stock the mobile fulfillment container(s) 402.

Inventory data 512 (e.g., inventory level(s), report(s), historical data, RFID tag identification data, etc.) determined by the inventory monitoring circuitry 502 can be stored an example database 514. In some examples, the mobile container control circuitry 430 includes the database 514. In some examples, the database 514 is located external to the mobile container control circuitry 430 in a location accessible to the mobile container control circuitry 430 as shown in FIG. 5.

The order managing circuitry 504 of the example mobile container control circuitry 430 of FIG. 5 detects orders received for goods in one or more of the mobile fulfillment containers 402 based on data received from the commerce management engine 136. The order managing circuitry 504 identifies one or more mobile fulfillment containers 402 in the environment 300 that can satisfy an order based on, for example, the inventory data 512 generated by the inventory monitoring circuitry 502. In some examples, the order managing circuitry 504 determines whether a mobile fulfillment container 402 can satisfy two or more orders based on pending orders received from the commerce management engine 136.

The order managing circuitry 504 identifies information associated with the order(s) such as a location of the user who placed a particular order (e.g., the first house 304 of FIG. 3, an address provided by the user 310 in the environment 300, etc.), a requested or expected order retrieval time as requested by the user, etc. The information extracted from the orders by the order managing circuitry 504 can be stored in the database 514 as order data 516.

The container tracking circuitry 506 of the example mobile container control circuitry 430 of FIG. 5 identifies a location (i.e., a current location) of the respective mobile fulfillment containers 402 in the environment 300 of FIG. 3. In some examples, the container tracking circuitry 506 determines the location(s) of the mobile fulfillment container(s) 402 at intervals (e.g., every 30 seconds, every two minutes, which may be predefined intervals, configured based on user input, adaptive, etc.). In other examples, container tracking circuitry 506 determines the location(s) of the mobile fulfillment container(s) 402 in response to particular events (e.g., an indication that the self-driving vehicle has stopped movement) and/or user inputs. The container tracking circuitry 506 can determine the location(s) of the mobile fulfillment container(s) 402 based on data from the navigation sensor(s) 419 (e.g., GPS data). The container tracking circuitry 506 generates container location data 518 that is stored in the database 514.

The destination determining circuitry 508 of the example mobile container control circuitry 430 of FIG. 5 selects a particular mobile fulfillment container 402 to fulfill one or more orders from the one or more mobile fulfillment containers 402. In some examples, the destination determining circuitry 508 selects the particular mobile fulfillment container 402 from the mobile fulfillment container(s) 402 identified by the order managing circuitry 504 as capable of fulfilling the order and based on, for example, the container location data 518 generated by the container tracking circuitry 506.

In some examples, the destination determining circuitry 508 selects an initial destination for each mobile fulfillment container 402 in the environment 300 based on inventory stored in the container 402 and demand for the inventory as determined by the inventory monitoring circuitry 502. The initial destination for the mobile fulfillment container 402 can be the destination to which the container 402 travels or is transported after leaving the warehouse 314, 316 of FIG. 3 and prior to the container 402 being associated with any orders.

As disclosed herein, in response to receipt of order(s), the order managing circuitry 504 associates the order(s) with the mobile fulfillment container(s) 402 that contain the inventory to fulfill the order(s). In the example of FIG. 5, the destination determining circuitry 508 executes one or more destination optimization model(s) or algorithm(s) 520 to identify a mobile fulfillment container 402 to fulfill the order and to dynamically select a retrieval destination (i.e., a geographical location) in the environment 300 of FIG. 3 for the identified mobile fulfillment container 402. The retrieval destination enables one or more users to access the container 402 to retrieve goods from the container 402 at a particular location in the environment 300 and, thus, fulfill or complete the order(s). The destination optimization model(s) 520 are stored in the database 514.

The destination optimization model(s) 520 can use variables such as a current location of each mobile fulfillment container 402 that has been identified by the order managing circuitry 504 as capable of satisfying an order and the location(s) of user(s) associated with each of the pending orders to be fulfilled to select a destination for one of the containers 402 to enable one or more orders to be fulfilled by the particular container 402. In some examples, the destination determining circuitry 508 selects a destination that minimizes a distance between the mobile fulfillment container 402 and a location of each user who has placed an order to be retrieved from the mobile fulfillment container 402 prior to a particular time (e.g., prior to execution of the destination optimization model(s) 520 at a given time). The location of each user can be determined based on the order data 516 identified by the order managing circuitry 504 and can include an address or other location information provided by the user when completing the order (e.g., a home address for the house(s) 304, 308 of FIG. 3, a current user location address for the user 310 of FIG. 3). In some examples, the destination optimization model(s) 520 account for locations of other mobile fulfillment containers 402 in the environment 300 to avoid, for instance, placing multiple containers 402 in close proximity in the environment. In some examples, the destination optimization model(s) 520 account for locations of other mobile fulfillment containers in the environment to place the containers in close proximity to meet demand.

In some examples, the example destination determining circuitry 508 determines a route for the mobile fulfillment container 402 to travel or be transported from a current location of the container 402 (e.g., an initial location) to the retrieval destination. The destination determining circuitry 508 can determine the route based on route identification rule(s) 522 stored in the database 514. The route identification rule(s) 522 can include travel rule(s) such as traffic restrictions and/or limitations on vehicles such as autonomous vehicles in the environment 300, streets that include bicycle lanes in examples in which the mobile fulfillment container 402 is transported via a bicycle, etc. The route identification rule(s) 522 can identify particular locations for the mobile fulfillment container 402 to be located when the container 402 arrives at the destination (e.g., a particular parking spot in a parking lot). In some examples, the destination determining circuitry 508 determines the route based on data received from the navigation sensor(s) 419 (e.g., GPS data) during travel of the mobile fulfillment container 402.

The destination determining circuitry 508 outputs instruction(s) including the retrieval destination for the mobile fulfillment container 402 selected to fulfill the order(s). In some examples, the instruction(s) include the route for the mobile fulfillment container 402 to travel or be transported to reach the retrieval destination. In some examples, the destination instruction(s) are transmitted to the vehicle control circuitry 114 of the mobile fulfillment container 402 (e.g., an autonomous vehicle) to cause the mobile fulfillment container 402 to travel to the destination. In some examples, the instruction(s) can be transmitted to a transport control application 524 installed on a user device associated with, for instance, a driver of a vehicle that is transporting the mobile fulfillment container 402 (e.g., the user device 434, where the transport control application 524 is executed by the processor circuitry 432 of FIG. 4). The driver can move the mobile fulfillment container 402 to the retrieval destination identified in the instructions (e.g., by following the identified route).

The destination determining circuitry 508 dynamically selects or adjusts the retrieval destination(s) of the respective mobile fulfillment containers 402 over time based on, for example, additional (e.g., new) order(s) that have been received and associated with corresponding ones of the containers 402, previously placed order(s) that have not yet been retrieved from a particular container 402, requested user pick-up times, inventory level(s) of the respective containers 402, a distance of the container(s) 402 from the warehouse 314, 316 of FIG. 3, etc. In some examples, the destination determining circuitry 508 identifies a new (i.e., updated) destination for a mobile fulfillment container 402 based on the location(s) of user(s) associated with other orders to be retrieved from the container 402, such as the location(s) of user(s) who have not yet retrieved orders from the container 402 and/or the location(s) of user(s) who placed (e.g., new) orders after a first or previous destination was determined for the container 402. The destination determining circuitry 508 executes the destination optimization model(s) 520 to optimize (e.g., minimize) a distance between the mobile fulfillment container 402 and the users with outstanding orders to be filled at the container 402. The destination determining circuitry 508 outputs instructions including the updated destination(s) for the container 402 in response to the dynamic destination adjustments.

Referring to FIG. 3 as an example, the destination determining circuitry 508 can identify a first retrieval destination for the first mobile fulfillment container 318, 402 based on a first order received from the first user 302 of the first house 304 and a second order received from the third user 310, where the first order and the second order are associated with the container 318, 402 by the order managing circuitry 504. After the container 318, 402 has arrived at the first retrieval destination (e.g., the location shown in FIG. 3) and the first order has been retrieved from the mobile fulfillment container 318, 402 (e.g., by the first user 302), the order managing circuitry 504 can associate a third order received from the second user 306 with the container 318, 402 based on the goods for the order and the inventory in the container 318, 402. The destination determining circuitry 508 can execute the destination optimization model(s) 520 to determine if the retrieval destination of the mobile fulfillment container 318, 402 should be updated based on the current location of the container 402 (i.e., the location of the first retrieval destination shown in FIG. 3), the location of the third user 310 associated with second order, and the location of the second user 306 associated with the third (i.e., newly received) order. In some such examples, the destination determining circuitry 508 determines that the mobile fulfillment container 318, 402 should move to a location more proximate to the second house 308 (e.g., between the user 310 and the second house 308).

In some examples, the destination determining circuitry 508 generates instructions including an updated destination for the mobile fulfillment container 402 if the container 402 has been at the destination for a threshold period of time (e.g., one hour, five hours, twelve hours, which may be predefined, configured based on user input, adaptive, etc.). In some examples, the destination determining circuitry 508 determines an amount of time for the mobile fulfillment container 402 to remain at a destination based on the number of orders associated with the container 402. In some examples, the destination determining circuitry 508 dynamically determines the amount of time based on the requested pick-up times for the order(s) and/or inputs from the user(s) (e.g., received via the customer device(s) 150) indicating that the user(s) are travelling to the container 402 retrieve the order.

In some examples, the destination determining circuitry 508 coordinates movement between two or more mobile containers 402. In some examples, the destination determining circuitry 508 can direct two or more mobile containers 402 to a destination based on, for example, expected demand for inventory, actual orders placed for particular goods in the containers 402, etc. In some examples, the destination determining circuitry 508 can coordinate movement between two or more mobile containers 402 to satisfy incoming orders that may involve different optimal retrieval destinations. For example, a first mobile fulfillment container 402 can arrive at a first retrieval destination. The destination determining circuitry 508 can direct the first mobile fulfillment container 402 to leave the first retrieval destination based on new orders received for goods associated with the first mobile fulfillment container 402. The destination determining circuitry 508 can generate instructions for a second mobile fulfillment container 402 to travel or be transported to the first retrieval destination that the first mobile fulfillment container left to, for instance, enable orders that had not yet been retrieved from the first mobile fulfillment container 402 to be filled.

The container tracking circuitry 506 can identify when a mobile fulfillment container 402 has arrived at the retrieval destination based on data from the navigation sensor(s) 419 and/or the image sensor(s) 429. In some examples, in response to the container tracking circuitry 506 determines that the mobile fulfillment container 402 has arrived at the retrieval destination, the order managing circuitry 504 generates notification(s) to be output to the user(s) (e.g., via the application(s) 142A-B, the customer device(s) 150) to inform the users that the container 402 has arrived at the pick-up location.

In some examples, the order managing circuitry 504 generates notification(s) to be output to user(s) e.g., via the application(s) 142A-B, the customer device(s) 150) to inform the users that the retrieval destination of the container 402 has been adjusted. As disclosed herein, the destination determining circuitry 508 can adjust the retrieval destination for a mobile fulfillment container 402 based on, for instance, newly received orders and the location(s) of the user(s) associated with those orders. In some such examples, the notification(s) include the expected departure time of the mobile fulfillment container 402 from the current or previously identified retrieval destination, the expected arrival time at the updated retrieval destination, etc.

The security monitoring circuitry 510 of the example mobile container control circuitry 430 of FIG. 5 controls access to the inventory stored in the storage area 404 (FIG. 4) of the mobile fulfillment container 402 when the container 402 is at a designated retrieval destination. In some examples, the security monitoring circuitry 510 authenticates a user (e.g., the user(s) 302, 306, 310) based on, for example, user input(s) entered via the display screen 420 of the container 402, such as an order number, a barcode, customer name, name of a designated pick-up person, and/or other identifier associated with the order. In some examples, the user input(s) can be provided via the customer device 150 (e.g., via the application 142A-B). The security monitoring circuitry 510 can compare the order identification information provided by the user to the order data 516 identified by the order managing circuitry 504.

In some examples, a user may place an order for goods in the mobile fulfillment container 402 when the mobile fulfillment container 402 is at the retrieval destination or another destination (e.g., an initial destination after leaving the warehouse 314, 316). For instance, the user may walk or drive to the destination at which the mobile fulfillment container 402 is located prior to placing an order. When the user arrives at the mobile fulfillment container 402, the user can place an order via, for instance, the display screen 420 of the mobile fulfillment container 402. In such examples, the security monitoring circuitry 510 can provide access to the storage area 404 of the mobile fulfillment container 402 in response to the placement of the order via, for instance, the display screen 420 of the container 402. In some examples, the user can place the order via, for example, the customer device 150 and the security monitoring circuitry 510 authenticates the user based on, for example, the user scanning his or her customer device 150 at the container 402 and/or entering a code associated with the order and/or the container 402 (e.g., a container label visible to a user who is at the same location as the container) via the customer device 150 and/or the display screen 420 of the container 402, etc. In some such examples, the user indicates that the user is at the mobile fulfillment container 402 when placing the order via the customer device 150.

In some examples, in response to authentication of the user as authorized to retrieve goods from the container 402, the security monitoring circuitry 510 causes the lock(s) 406 of the storage area 404 to unlock to enable the user access to one or more portion(s) (e.g., unit(s)) of the storage area 404. In some examples, the security monitoring circuitry 510 generates instructions to cause the robotic arm(s) 408 to retrieve certain good(s) associated with an order from the storage area 404 and to deliver the good(s) to a portion of the storage area 404 for access by the user. In some examples, the security monitoring circuitry 510 restricts access to the storage area 404 (e.g., instruct the lock(s) 406 to re-lock) after a threshold period of time (which may be predefined, configured based on user input, adaptive, etc.).

In some examples, the security monitoring circuitry 510 detects that the good(s) associated with the order have been removed based on data from the electronic gating sensor(s) 428. For instance, the security monitoring circuitry 510 can detect that a particular good has been removed from the storage area based on an RFID tag associated with the good. The security monitoring circuitry 510 can match the good to the order. In some examples, the security monitoring circuitry 510 can detect a particular good removed from the storage area 404 based on object recognition in image data generated by the image sensor(s) 429. In response to detecting that all the goods in the order have been removed from the storage area 404, the security monitoring circuitry 510 can restrict access to the storage area 404 (e.g., cause the lock(s) 406 to re-lock). In some examples, the security monitoring circuitry 510 restricts access to the storage area 404 based on confirmation from the user (e.g., via the customer device 150) that the goods have been received. In response to the determination by the security monitoring circuitry 510 that all goods associated with the order have been removed from the storage area 404, the order managing circuitry 504 can provide a notification to the commerce management engine 136 that the order has been fulfilled.

The security monitoring circuitry 510 monitors user activity with respect to inventory in the mobile fulfillment container 402 based on data from the electronic gating sensor(s) 428 and/or the image sensor(s) 429. For example, the security monitoring circuitry 510 can track the goods removed from the storage area 404 based on RFID tags associated with the goods and corresponding RFID information in the inventory data 512. In some examples, the security monitoring circuitry 510 identifies the goods removed from the storage area 404 by analyzing image data collected by the image sensor(s) 429 and object recognition.

In some examples, the security monitoring circuitry 510 causes alert(s) to be generated if the security monitoring circuitry 510 determines that the user removed good(s) from the storage area 404 that were not part of the order. The alert(s) can be output via, for example, the speaker(s) 427 of the mobile fulfillment container 402 (e.g., audio alert(s)), the display screen 420 (e.g., visual alert(s)), the application(s) 142A-B installed on the customer device 150 associated with the user, etc. The security monitoring circuitry 510 can report the alert(s) to the commerce management engine 136 to alert the merchant and/or warehouse. In some examples, the security monitoring circuitry 510 can instruct the image sensor(s) 429 to generate image data to capture the individual(s) proximate to the container 402 at the time the good(s) were detected as being removed. In some examples, the security monitoring circuitry 510 can automatically alert authorities (e.g., police) if, for instance, a good of a particular financial value and/or a particular number of goods is removed from the storage area 404 that are not associated with the order.

In some examples, the security monitoring circuitry 510 automatically initiates a payment transaction in response detecting that the user accessed good(s) not associated with the order (for which the security monitoring circuitry 510 provided access to the storage area 404) have been removed from the storage area 404. For instance, the security monitoring circuitry 510 can provide instructions to the commerce management engine 136 to charge a credit card associated with the user. In some examples, the security monitoring circuitry 510 outputs a prompt to be presented to the user (e.g., via the display screen 420) prior to initiating the payment transaction. The prompt can inform the user that the payment will be initiated if the good(s) are not returned to the storage area 404 within a threshold period of time. In some examples, the security monitoring circuitry 510 initiates a self-checkout option via, for example, the application(s) 142A-B installed on the customer device 150 and/or the display screen 420 to enable the user to purchase the good(s) obtained from the storage area 404 that are not associated with the order.

In some examples, the security monitoring circuitry 510 generates the alert(s) to inform the user that one or more of the goods associated with the order were not retrieved from the storage area 404. In some examples, the security monitoring circuitry 510 determines that the user is no longer interacting with the inventory in the storage area 404 if, for instance, no goods have been removed from the storage area 404 within a threshold time period (e.g., as detected based on image data and/or RFID data). In some examples, the security monitoring circuitry 510 can instruct the commerce management engine 136 to initiate a communication line (e.g., a live chat) between the user and the merchant in response to user interaction(s) with the inventory in the mobile fulfillment container 402.

In some examples, the mobile container control circuitry 430 includes means for interfacing. For example, the means for interfacing may be implemented by the merchant/warehouse interface circuitry 500. In some examples, the merchant/warehouse interface circuitry 500 may be instantiated by processor circuitry such as the example processor circuitry 1012 of FIG. 10. For instance, the merchant/warehouse interface circuitry 500 may be instantiated by the example general purpose processor circuitry 1100 of FIG. 11 executing machine executable instructions such as that implemented by at least blocks 802, 824, 828 of FIGS. 8A-8C. In some examples, the merchant/warehouse interface circuitry 500 may be instantiated by hardware logic circuitry, which may be implemented by an ASIC or the FPGA circuitry 1200 of FIG. 12 structured to perform operations corresponding to the machine readable instructions. Additionally or alternatively, the merchant/warehouse interface circuitry 500 may be instantiated by any other combination of hardware, software, and/or firmware. For example, the merchant/warehouse interface circuitry 500 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the mobile container control circuitry 430 includes means for inventory monitoring. For example, the means for inventory monitoring may be implemented by the inventory monitoring circuitry 502. In some examples, the inventory monitoring circuitry 502 may be instantiated by processor circuitry such as the example processor circuitry 1012 of FIG. 10. For instance, the inventory monitoring circuitry 502 may be instantiated by the example general purpose processor circuitry 1100 of FIG. 11 executing machine executable instructions such as that implemented by at least blocks 804, 846 of FIGS. 8A-8C. In some examples, the inventory monitoring circuitry 502 may be instantiated by hardware logic circuitry, which may be implemented by an ASIC or the FPGA circuitry 1200 of FIG. 12 structured to perform operations corresponding to the machine readable instructions. Additionally or alternatively, the inventory monitoring circuitry 502 may be instantiated by any other combination of hardware, software, and/or firmware. For example, the inventory monitoring circuitry 502 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the mobile container control circuitry 430 includes means for managing orders. For example, the means for managing orders may be implemented by the order managing circuitry 504. In some examples, the order managing circuitry 504 may be instantiated by processor circuitry such as the example processor circuitry 1012 of FIG. 10. For instance, the order managing circuitry 504 may be instantiated by the example general purpose processor circuitry 1100 of FIG. 11 executing machine executable instructions such as that implemented by at least blocks 806, 822, 824, 828, 840, 854 of FIGS. 8A-8C. In some examples, the order managing circuitry 504 may be instantiated by hardware logic circuitry, which may be implemented by an ASIC or the FPGA circuitry 1200 of FIG. 12 structured to perform operations corresponding to the machine readable instructions. Additionally or alternatively, the order managing circuitry 504 may be instantiated by any other combination of hardware, software, and/or firmware. For example, the order managing circuitry 504 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the mobile container control circuitry 430 includes means for tracking. For example, the means for managing may be implemented by the container tracking circuitry 506. In some examples, the container tracking circuitry 506 may be instantiated by processor circuitry such as the example processor circuitry 1012 of FIG. 10. For instance, the container tracking circuitry 506 may be instantiated by the example general purpose processor circuitry 1100 of FIG. 11 executing machine executable instructions such as that implemented by at least blocks 802, 814, 842 of FIGS. 8A-8C. In some examples, the container tracking circuitry 506 may be instantiated by hardware logic circuitry, which may be implemented by an ASIC or the FPGA circuitry 1200 of FIG. 12 structured to perform operations corresponding to the machine readable instructions. Additionally or alternatively, the container tracking circuitry 506 may be instantiated by any other combination of hardware, software, and/or firmware. For example, the container tracking circuitry 506 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the mobile container control circuitry 430 includes means for determining. For example, the means for determining may be implemented by the destination determining circuitry 508. In some examples, the destination determining circuitry 508 may be instantiated by processor circuitry such as the example processor circuitry 1012 of FIG. 10. For instance, the destination determining circuitry 508 may be instantiated by the example general purpose processor circuitry 1100 of FIG. 11 executing machine executable instructions such as that implemented by at least blocks 808, 810, 812, 830, 832, 834, 836, 838, 844, 848, 850, 852 of FIGS. 8A-8C. In some examples, the destination determining circuitry 508 may be instantiated by hardware logic circuitry, which may be implemented by an ASIC or the FPGA circuitry 1200 of FIG. 12 structured to perform operations corresponding to the machine readable instructions. Additionally or alternatively, the destination determining circuitry 508 may be instantiated by any other combination of hardware, software, and/or firmware. For example, the destination determining circuitry 508 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the mobile container control circuitry 430 includes means for security monitoring. For example, the means for security monitoring may be implemented by the security monitoring circuitry 510. In some examples, the security monitoring circuitry 510 may be instantiated by processor circuitry such as the example processor circuitry 1012 of FIG. 10. For instance, the security monitoring circuitry 510 may be instantiated by the example general purpose processor circuitry 1100 of FIG. 11 executing machine executable instructions such as that implemented by at least blocks 816, 818, 820, 826 of FIGS. 8A-8C and blocks 900, 902, 904, 906, 908, 910 of FIG. 9. In some examples, the security monitoring circuitry 510 may be instantiated by hardware logic circuitry, which may be implemented by an ASIC or the FPGA circuitry 1200 of FIG. 12 structured to perform operations corresponding to the machine readable instructions. Additionally or alternatively, the security monitoring circuitry 510 may be instantiated by any other combination of hardware, software, and/or firmware. For example, the security monitoring circuitry 510 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the mobile container control circuitry 430 of FIG. 4 is illustrated in FIG. 5, one or more of the elements, processes, and/or devices illustrated in FIG. 5 may be combined, divided, re-arranged, omitted, eliminated, and/or implemented in any other way. Further, the example merchant/warehouse interface circuitry 500, the example inventory monitoring circuitry 502, the example order managing circuitry 504, the example container tracking circuitry 506, the example destination determining circuitry 508, the example security monitoring circuitry 510, and/or, more generally, the example mobile container control circuitry 430 of FIG. 5, may be implemented by hardware alone or by hardware in combination with software and/or firmware. Thus, for example, any of the example merchant/warehouse interface circuitry 500, the example inventory monitoring circuitry 502, the example order managing circuitry 504, the example container tracking circuitry 506, the example destination determining circuitry 508, the example security monitoring circuitry 510, and/or, more generally, the example mobile container control circuitry 430, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example mobile container control circuitry 430 may include one or more elements, processes, and/or devices in addition to, or instead of, those illustrated in FIG. 5, and/or may include more than one of any or all of the illustrated elements, processes, and devices.

Flowcharts representative of example hardware logic circuitry, machine readable instructions, hardware implemented state machines, and/or any combination thereof for implementing the mobile container control circuitry of FIG. 5 are shown in FIGS. 8A-C and 9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 8A-C and 9, many other methods of implementing the example mobile container control circuitry 430 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 8A-C and 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 6:
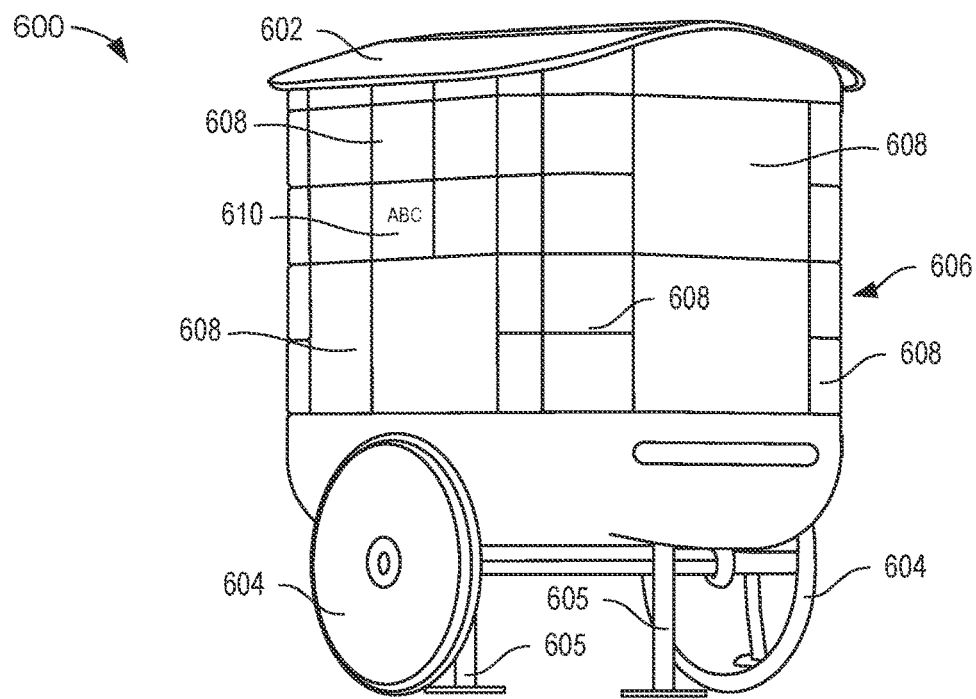
FIGS. 6 and 7 illustrate an example mobile fulfillment container in accordance with teachings of this disclosure.

FIG. 6 illustrates an example mobile fulfillment container 600 in accordance with teaches of this disclosure. The example mobile fulfillment container 600 of FIG. 6 includes a housing 602 supported by wheels 604. The example mobile fulfillment container 600 includes supports 605 to enable the container 600 to rest at a location in an environment (e.g., a retrieval destination in the environment 300 of FIG. 3). The size and/or shape of the mobile fulfillment container 600 of FIG. 6 can differ from the example shown in FIG. 6.

The housing 602 of the mobile fulfillment container 600 defines a storage area 606 for carrying inventory. In the example of FIG. 6, the storage area 606 includes a plurality of storage units 608. Each of the storage units 608 can store one or more goods. The storage units 608 can have different sizes and/or shapes than the example shown in FIG. 6. Also, the storage area 606 can includes additional or fewer storage units 608 than shown in FIG. 6 (e.g., one storage unit, fifty storage units). The storage units 608 can include locks (e.g., electric locks, the locks 406 of FIG. 4) to provide selective access to the inventory stored in the storage units 608 (e.g., based on instructions from the security monitoring circuitry 510 of the example mobile container control circuitry 430 of FIG. 5). The storage units 608 can include, for instance, shelves. In some examples, the storage area 606 includes on storage unit 608 and the inventory is stored on shelves.

The example mobile container 600 includes a display screen 610 to enable one or more users to interact with the mobile fulfillment container 600. For instance, a user (e.g., the user(s) 302, 306, 310 of FIG. 3) can provide an order identifier via the display screen 610 as part of an authentication process to enable the user to access the goods in the storage unit(s) 608. In some examples, a merchant or warehouse employee can provide identification information via the display screen 610 to access the storage unit(s) 608 during loading of the mobile container 600.

In some examples, the mobile fulfillment container 600 is an autonomous vehicle. In some examples, the mobile fulfillment container 600 of FIG. 6 includes a trailer hitch and/or other mechanical coupling mechanism to enable the container 600 to be coupled to a vehicle such as a car, truck, bicycle, etc. In some examples, the mobile fulfillment container 600 of FIG. 6 includes handle(s) to enable the container 600 to be pulled or pushed by individual(s).

Figure 7:
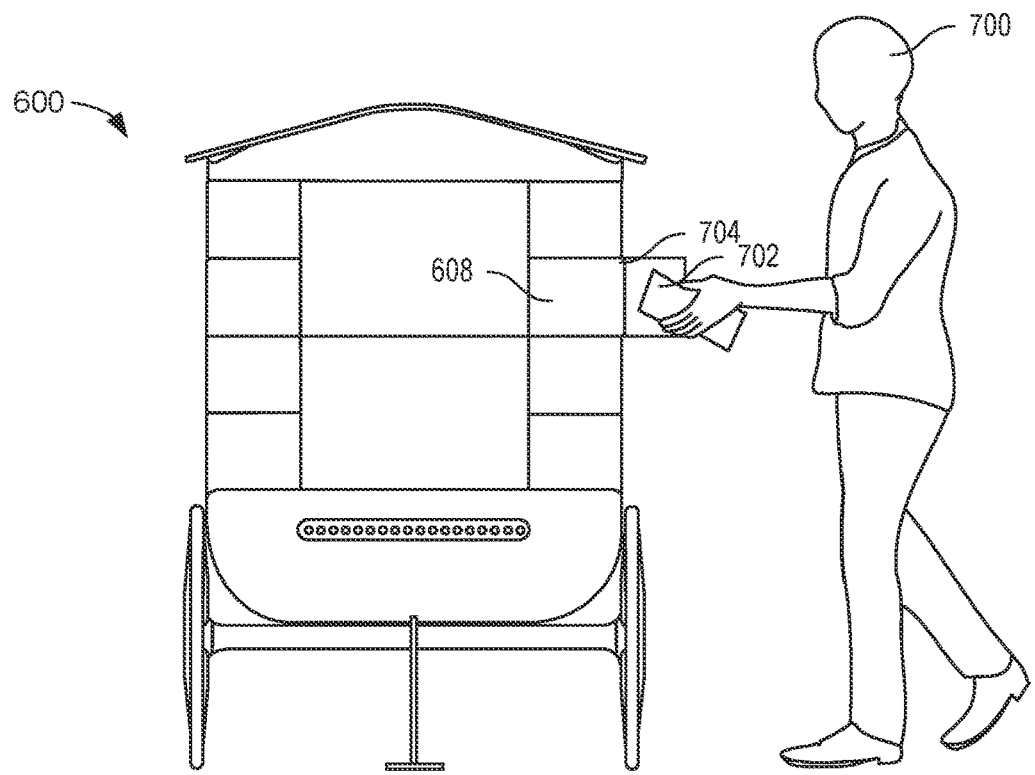

FIG. 7 illustrates the mobile fulfillment container 600 of FIG. 6 with one of the storage units 608 in an unlocked position (e.g., based on instructions from the security monitoring circuitry 510 of the example mobile container control circuitry 430 of FIG. 5). As shown in FIG. 7, a user 700 (e.g., a consumer) can access a good 702 stored in the unlocked storage unit 608 when a door 704 of the storage unit 608 is opened. In other examples, the user 700 (e.g., a warehouse employee) can load the good 702 into the unlocked storage unit 608 to stock the mobile container 600 with inventory.

Figure 8A:
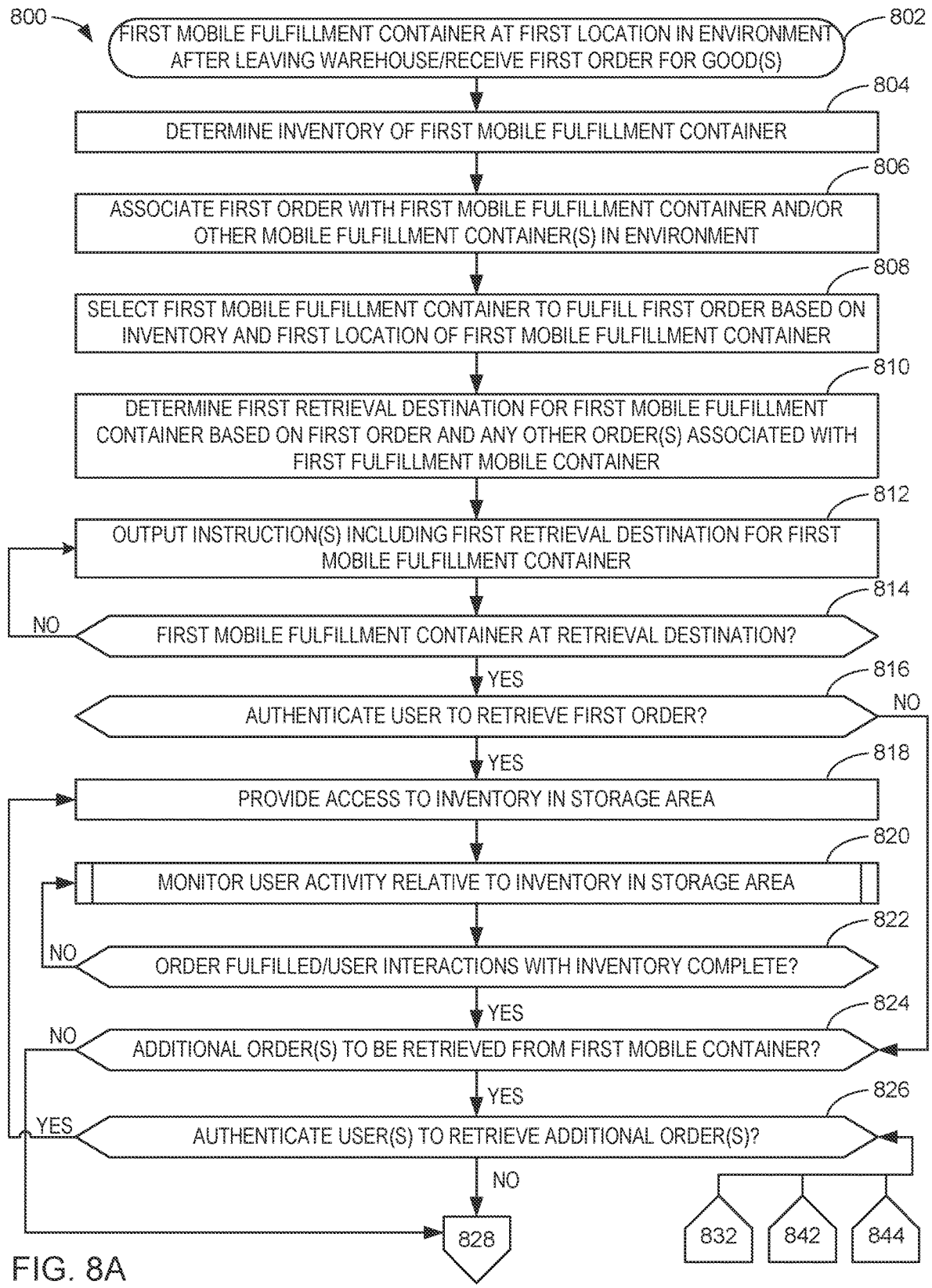
FIGS. 8A-C and 9 are flowcharts representative of example machine readable instructions and/or example operations that may be executed by example processor circuitry to implement the mobile container control circuitry of FIG. 5.
Figure 8B:
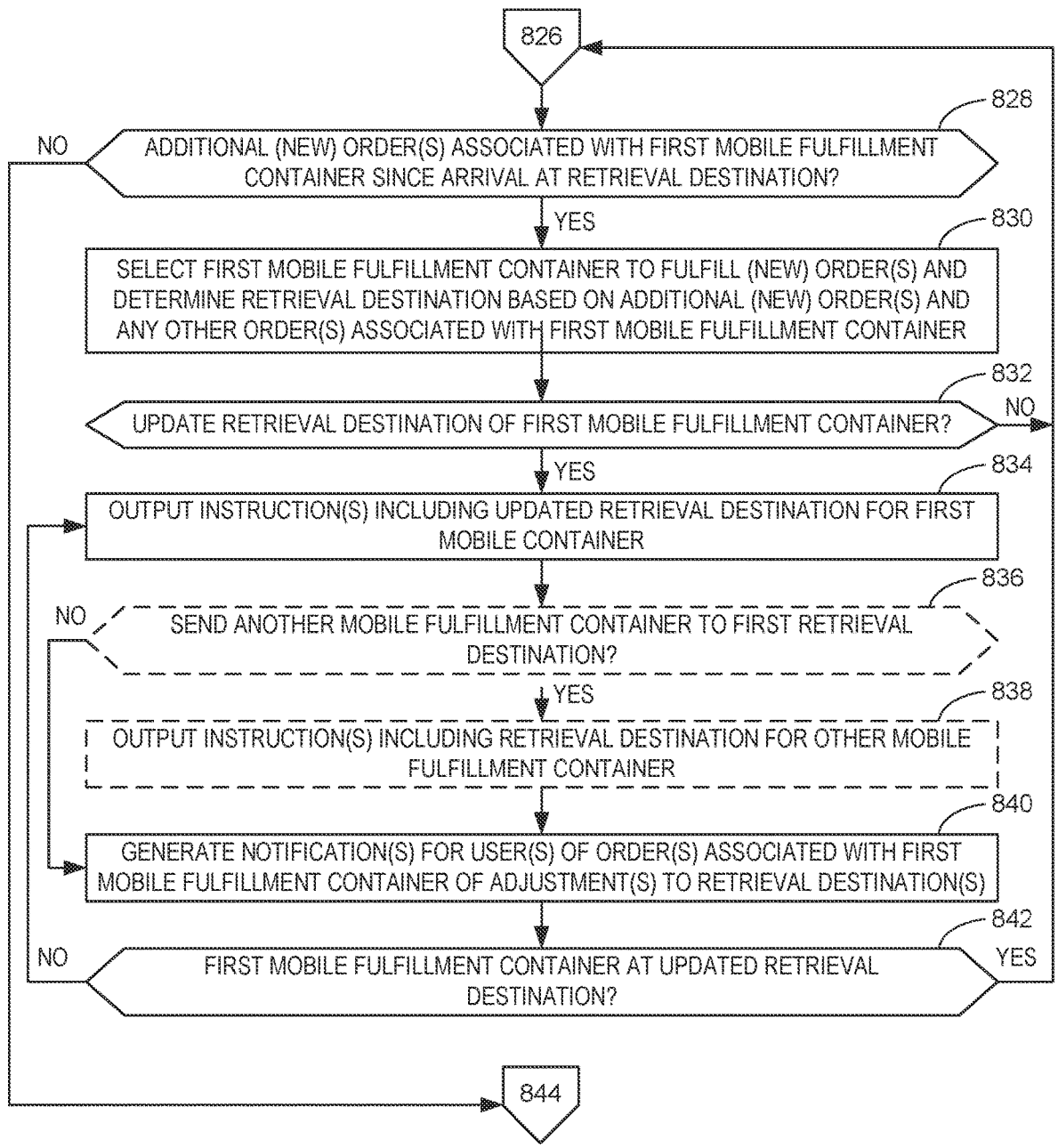
Figure 8C:
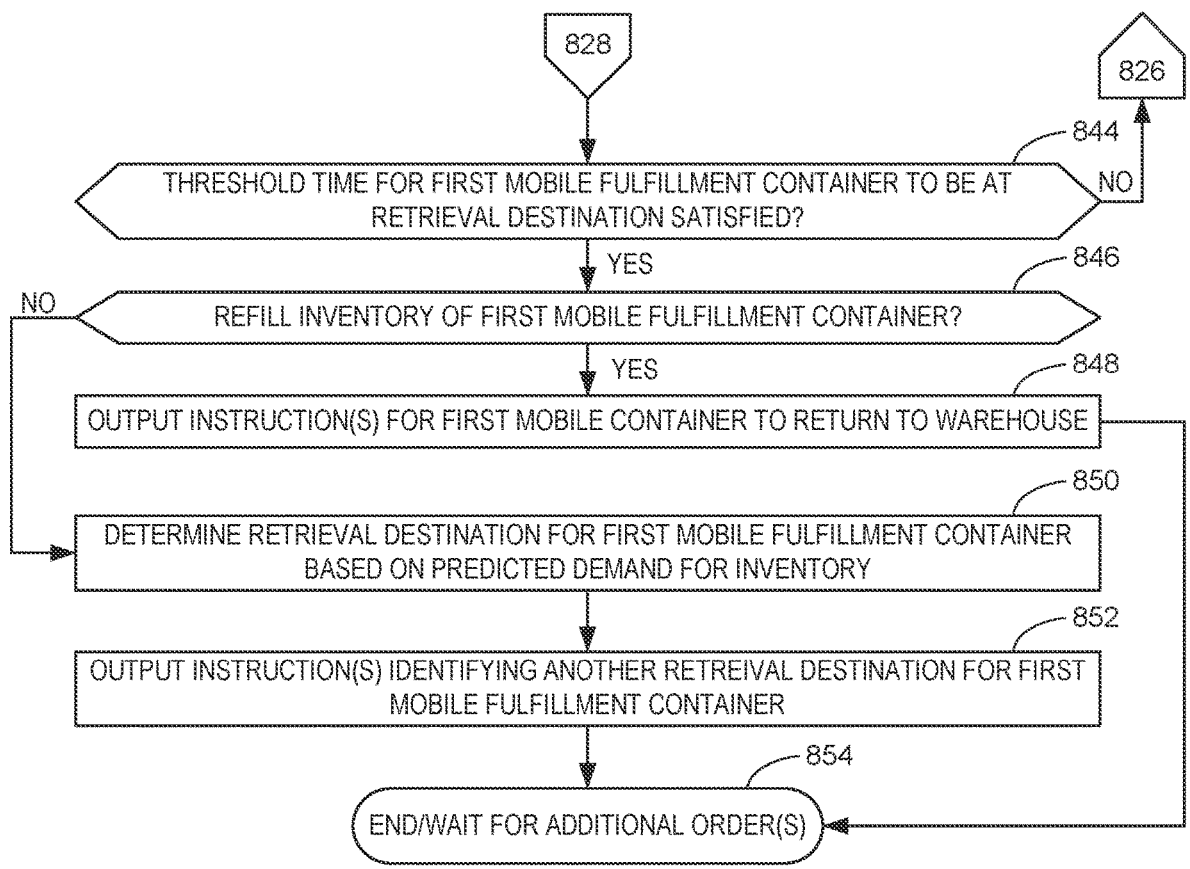

FIGS. 8A, 8B, and 8C include a flowchart representative of example machine readable instructions and/or example operations 800 that may be executed and/or instantiated by processor circuitry to manage the mobile fulfillment container(s) (e.g., the mobile fulfillment container(s) 318, 320, 402, 600 of FIGS. 3, 4, and/or 6) in an environment (e.g., the environment 300 of FIG. 3). The machine readable instructions and/or the operations 800 of FIG. 8 begin at block 802, in which a first mobile fulfillment container 318, 320, 402, 600 is at a first location in the environment 300 after leaving a warehouse 314, 316. The container tracking circuitry 506 of FIG. 5 identifies the location of the first mobile fulfillment container 318, 320, 402, 600 based on data from the navigation sensor(s) 419 and/or the image sensor(s) 429.

Also, at block 802, a first order is received from a user (e.g., the user(s) 302, 306, 310) for good(s) via, for example, the online store 138 and/or the application(s) 142A-B installed on the customer device 150. The merchant/warehouse interface circuitry 500 of FIG. 5 can receive the first order from the commerce management engine 136.

At block 804, the inventory monitoring circuitry 502 of FIG. 5 determines the inventory in the first mobile fulfillment container 318, 320, 402, 600 based on, for example, data provided by the warehouse 314, 316 and/or the merchant as to the goods loaded into the first mobile fulfillment container 402.

At block 806, the order managing circuitry 504 of FIG. 5 associates the first order with the first mobile fulfillment container 318, 320, 402, 600 and/or other mobile containers 318, 320, 402, 600 in the environment 300 that contain inventory to meet the first order (i.e., the particular good(s) of the first order).

At block 808, the destination determining circuitry 508 of FIG. 5 selects or assigns the first mobile fulfillment container 318, 320, 402, 600 to fulfill the first order based on, for example, the inventory carried by the first mobile fulfillment container 318, 320, 402, 600 and the first location of the first mobile fulfillment container 318, 320, 402, 600 in the environment 300. The destination determining circuitry 508 can identify the first mobile fulfillment container 318, 320, 402, 600 to fulfill the first order based on execution of the destination optimization model(s) 520.

At block 810, the destination determining circuitry 508 determines a first retrieval destination for the first mobile fulfillment container 318, 320, 402, 600 based on the first order and any other order(s) associated with the first mobile fulfillment container 402. For example, the destination determining circuitry 508 executes the destination optimization model(s) 520 to determine a retrieval destination for the first mobile fulfillment container 318, 320, 402, 600 that minimizes the distance between the first mobile fulfillment container 318, 320, 402, 600 and the locations of the user(s) associated with the order(s) (the first order, any other orders) assigned to the first mobile fulfillment container 318, 320, 402, 600.

At block 812, the destination determining circuitry 508 outputs instruction(s) including the retrieval destination for the first mobile fulfillment container 318, 320, 402, 600. In examples in which the first mobile fulfillment container 318, 320, 402, 600 is an autonomous vehicle, the vehicle control circuitry 416 causes the first mobile fulfillment container 318, 320, 402, 600 to move to the retrieval destination. In some examples, the instruction(s) are provided to the transport control application 524 on a user device 434 of a driver who is transporting the first mobile fulfillment container 318, 320, 402, 600 to the retrieval destination.

At block 814, the container tracking circuitry 506 determines if the first mobile fulfillment container 318, 320, 402, 600 has arrived at the retrieval destination using data associated with the navigation sensor(s) 419 and/or the image sensor(s) 429.

At block 816, the security monitoring circuitry 510 of FIG. 5 determines if the user associated with the first order has been authenticated, which indicates whether the user has attempted to fulfill the first order when the first mobile fulfillment container 318, 320, 402, 600 is at the retrieval destination.

At block 818, if the security monitoring circuitry 510 has authenticated the user associated with the first order, the security monitoring circuitry 510 provides access to the inventory in the storage area 404 of the first mobile fulfillment container 318, 320, 402, 600. For example, the security monitoring circuitry 510 can cause one or more of the storage units 608 of the first mobile fulfillment container 318, 320, 402, 600 to unlock to enable the authenticated user to access to the inventory in the storage unit(s) 608. In some examples, the security monitoring circuitry 510 instructs the robotic arm(s) 408 of the first mobile fulfillment container 318, 320, 402, 600 to retrieve the good(s) associated with the order for delivery to the user.

Figure 9:
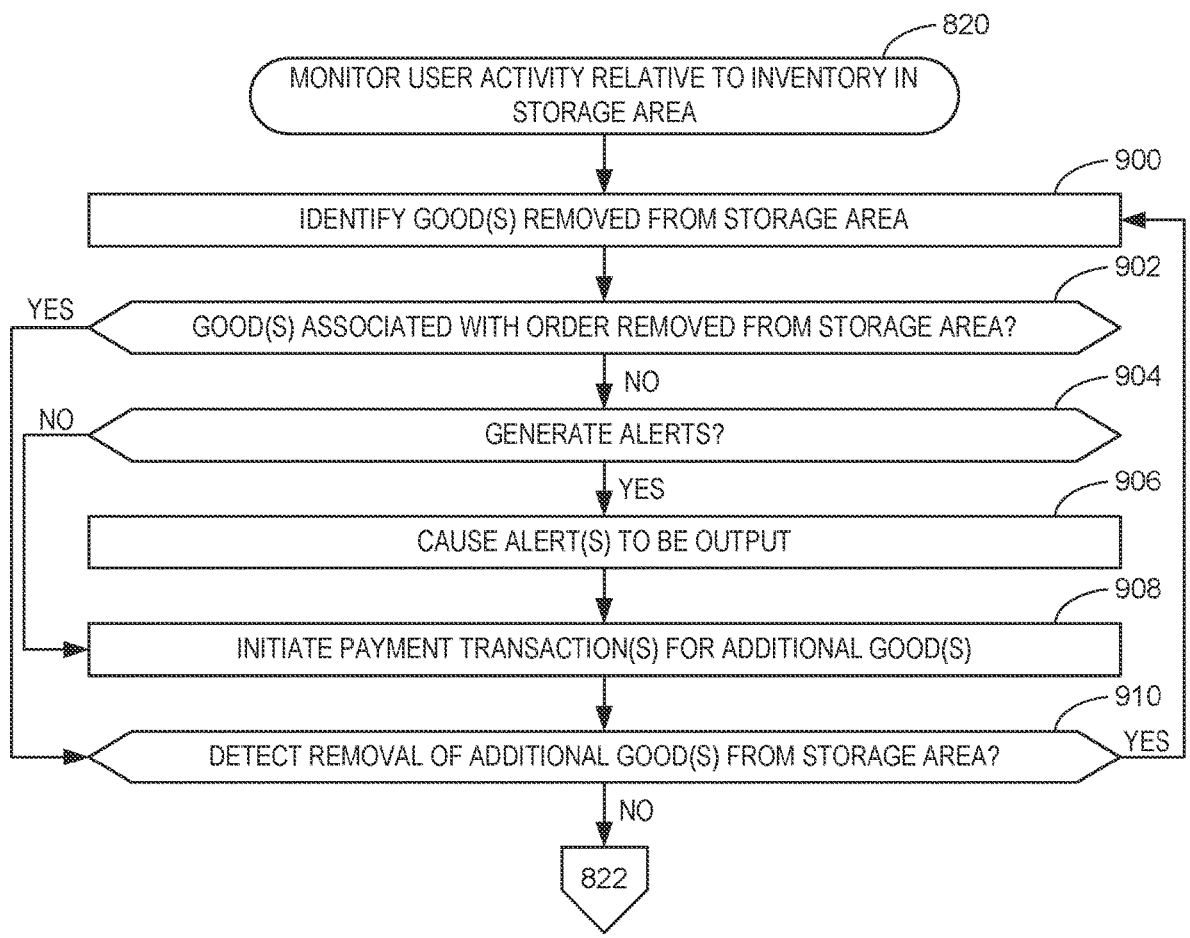

At block 820, the security monitoring circuitry 510 monitors user activity relative to the inventory in the storage area 404 of the first mobile fulfillment container 318, 320, 402, 600 as disclosed in connection with, for example, the example instructions 820 of FIG. 9. The security monitoring circuitry 510 continues to monitor the user activity with respect to the inventory in the storage area 404 until the order managing circuitry 504 determines that the order has been fulfilled (e.g., all goods associated with the order have been removed from the storage area 404 and payment for any additional goods has been initiated) and/or the security monitoring circuitry 510 determines that the user is no longer interacting with the inventory in the storage area 404 (e.g., no further goods have been removed within a threshold time period) (block 822).

At block 824, the order managing circuitry 504 determines if additional order(s) are to be retrieved from the first mobile fulfillment container 318, 320, 402, 600 (i.e., order(s) for which the first mobile fulfillment container 318, 320, 402, 600 was previously selected to fulfill). The merchant/warehouse interface circuitry 500 can receive the additional order(s) from the commerce management engine 136. Also, if the security monitoring circuitry 510 has not authenticated the user associated with the first order, control proceeds to block 824 from block 816 to determine if there are additional order(s) to be retrieved from the first mobile fulfillment container 402.

If there are additional order(s) to be retrieved from the first mobile fulfillment container 318, 320, 402, 600, the security monitoring circuitry 510 determines if the user(s) associated with the additional order(s) have been authenticated. If the user(s) associated with the additional order(s) have been authenticated, then control returns to block 818 to provide the authenticated user(s) with access to the inventory in the storage area 404.

If there are no additional orders to be retrieved from the storage area 404 and/or if the users associated with the additional orders have not been authenticated, then control proceeds to block 828, where the destination determining circuitry 508 determines if any new order(s) (e.g., newly received orders via the online store 138 and/or the applications 142A-B) have been associated with the first mobile fulfillment container 402 since the arrival of the first mobile fulfillment container 318, 320, 402, 600 at the retrieval destination. The merchant/warehouse interface circuitry 500 can receive the additional (new) order(s) from the commerce management engine 136.

If the order managing circuitry has associated additional (i.e., new) order(s) with the first mobile fulfillment container 318, 320, 402, 600 since the arrival of the first mobile fulfillment container 318, 320, 402, 600 at the retrieval destination, then at block 830, the destination determining circuitry 510 executes the destination optimization model(s) 520 to select the first mobile fulfillment container 318, 320, 402, 600 to fulfill the order(s) and to determine a retrieval destination for the first mobile fulfillment container 318, 320, 402, 600 based on the location(s) of the user(s) associated with the new order(s) and the location(s) of any user(s) associated with any other order(s) (e.g., order(s) previously assigned to the first mobile fulfillment container 318, 320, 402, 600).

If the destination determining circuitry 508 determines that the retrieval destination of the first mobile fulfillment container 318, 320, 402, 600 is to be updated (block 832), the destination determining circuitry 508 outputs instruction(s) including the updated retrieval destination for the first mobile fulfillment container 318, 320, 402, 600 at block 834. If there is no change to the retrieval destination, then control returns to block 826 to determine if the user(s) associated with the order(s) assigned to the first mobile fulfillment container 402 have been authenticated.

In some examples, if the retrieval destination for the first mobile fulfillment container 318, 320, 402, 600 is to be updated, then the destination determining circuitry 508 determines whether another mobile fulfillment container 318, 320, 402, 600 should be sent to the first retrieval destination at block 836. For example, if a user associated with an order that has not yet been retrieved from the first mobile fulfillment container 318, 320, 402, 600 indicates that he or she is travelling to the first retrieval destination, the destination determining circuitry 508 can select another (second) mobile fulfillment container 318, 320, 402, 600 including the inventory to satisfy the user's order and generate instructions for the second mobile fulfillment container 318, 320, 402, 600 to travel to or be transported to the first retrieval destination. Thus, the second mobile fulfillment container 318, 320, 402, 600 can enable the remaining order(s) to be fulfilled at the first retrieval destination while allowing other order(s) to be fulfilled via the first mobile fulfillment container 402 at the updated or new retrieval destination.

At block 840, the order managing circuitry 504 generates notification(s) to be output to the user(s) of the order(s) associated with the first mobile fulfillment container 318, 320, 402, 600 of the adjustment(s) to the retrieval destination(s). The notification(s) can be delivered via, for instance, the applications 142A-B installed on the customer device(s) 150.

At block 842, the container tracking circuitry 506 determines if the first mobile fulfillment container 318, 320, 402, 600 has arrived at the updated retrieval destination. When the first mobile fulfillment container 318, 320, 402, 600 has arrived at the updated retrieval destination, control proceeds to block 826 to determine if user(s) associated with the order(s) assigned to the first mobile fulfillment container 402 have been authenticated by the security monitoring circuitry 510.

Returning to block 828, if no additional (new) order(s) are associated with the first mobile fulfillment container 318, 320, 402, 600 when the first mobile fulfillment container 318, 320, 402, 600 is at a retrieval destination (e.g., after determining that the user of the first order has not been authenticated at block 816 when the first mobile fulfillment container 318, 320, 402, 600 is at the first retrieval destination; after determining that there are no additional orders associated with the first mobile fulfillment container 318, 320, 402, 600 when the first mobile container is at the first retrieval destination and/or the updated retrieval destination at block 824; and/or after determining that user(s) of any order(s) associated with the first mobile fulfillment container 318, 320, 402, 600 have not been authenticated at block 826), then control proceeds to block 844. At block 844, the destination determining circuitry 508 determines if a time threshold for the first mobile fulfillment container 318, 320, 402, 600 to remain at the retrieval destination has been satisfied. If the time threshold for the first mobile fulfillment container 318, 320, 402, 600 to remain at the retrieval destination has not been satisfied, the security monitoring circuitry 510 continues to determine if the user(s) of order(s) associated with the first mobile fulfillment container 318, 320, 402, 600 have been authenticated (block 826). If the time threshold for the first mobile fulfillment container 318, 320, 402, 600 has been satisfied, the control proceeds to block 846.

At block 846, if the inventory monitoring circuitry 502 determines that the inventory of the first mobile fulfillment container 402 should be refilled, then the destination determining circuitry 508 outputs instructions for the first mobile fulfillment container 402 to return to the warehouse at block 848 and the instructions of FIG. 8 end at block 854.

If, at block 846, the inventory monitoring circuitry 502 determines that the inventory of the first mobile fulfillment container 402 does not need to be refilled, the destination determining circuitry 508 determines a retrieval destination for the first mobile fulfillment container 318, 320, 402, 600 based on predicted demand for the inventory in the first mobile fulfillment container 318, 320, 402, 600 at block 850. For example, the inventory monitoring circuitry 502 determines the predicted demand based on historical purchase data for the inventory. At block 852, the destination determining circuitry 508 outputs instructions identifying another retrieval destination for the first mobile fulfillment container 318, 320, 402, 600. The instructions end at block 854 with the order managing circuitry 504 waiting to associate additional orders with the first mobile fulfillment container 402.

FIG. 9 is flowchart representative of example machine-readable instructions and/or example operations 820 that may be executed and/or instantiated by processor circuitry to implement block 820 of FIG. 8 to monitor user activity with respect to inventory in the storage area 404 of the first mobile fulfillment container 318, 320, 402, 600 of FIGS. 3, 4 and/or 6.

At block 900, the security monitoring circuitry 510 identifies the goods removed from the storage area 404 of the first mobile fulfillment container 318, 320, 402, 600. The security monitoring circuitry 510 can identify the goods based on, for example, RFID tag information detected by the electronic gating sensor(s) 428 and/or by performing object recognition using image data captured by the image sensor(s) 429.

At block 902, the security monitoring circuitry 510 determines if any goods not associated with the order have been removed from the storage area 404 of the first mobile fulfillment container 318, 320, 402, 600. The security monitoring circuitry 510 can compare the identified goods removed from the storage area 404 to the goods of the order based on the order data 516 generated by the order managing circuitry 504.

If the security monitoring circuitry 510 determines that good(s) not associated with the order have been removed from the storage area 404, then at block 904, the security monitoring circuitry 510 determines if alert(s) should be generated. If alert(s) are to be generated, then at block 906, the security monitoring circuitry 510 causes alert(s) to be output via, for example, the first mobile fulfillment container 318, 320, 402, 600 (e.g., visual alerts via the display screen 420, audio alerts via speaker(s) 427) and/or the customer device 150. The security monitoring circuitry 510 can communicate with the commerce management engine 136 to notify the merchant that alert(s) were generated.

In some examples, the alert(s) are not generated because the user may have the option to purchase other goods from the inventory in the first mobile fulfillment container 318, 320, 402, 600 after being authenticated. In some examples, the alert(s) are not generated because the value of the good(s) removed has not exceeded a threshold value.

At block 908, the security monitoring circuitry 510 initiates payment for the good(s) that have been removed from the storage area 404 of the first mobile fulfillment container 318, 320, 402, 600 that are not associated with the order. For example, the security monitoring circuitry 510 can cause a credit card associated with the order to be charged for the additional good(s).

The security monitoring circuitry 510 continues to monitor user interactions with the inventory in the storage area 404 (block 910). If there are not further user interactions with the inventory and/or if the order managing circuitry 504 determines that the order has been fulfilled (e.g., because only the goods associated with the order have been removed from the storage area 404), then control proceeds to block 822 of FIG. 8.

Figure 10:
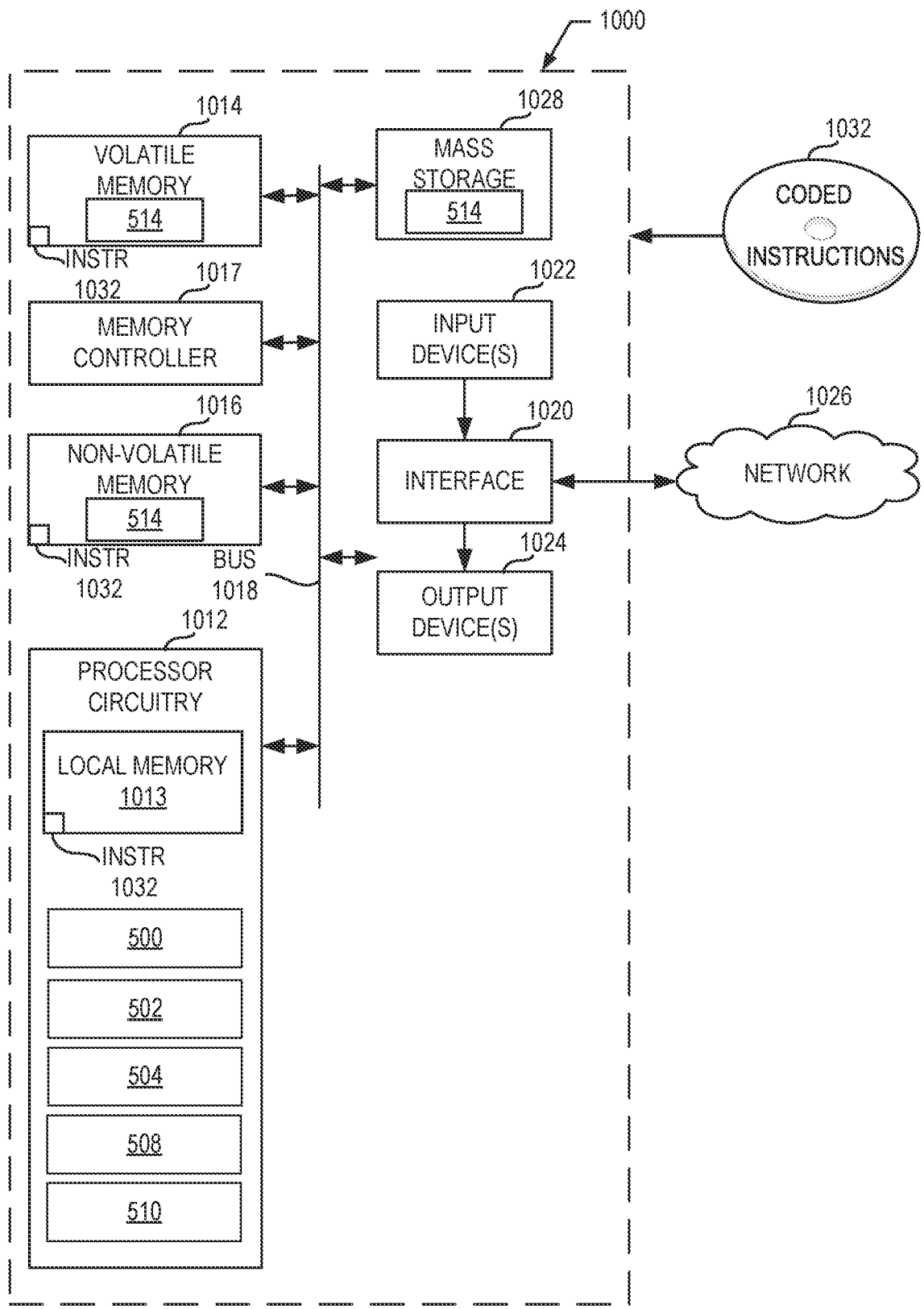
FIG. 10 is a block diagram of an example processing platform including processor circuitry structured to execute the example machine readable instructions and/or the example operations of FIGS. 8A-C and/or 9 to implement the mobile container control circuitry of FIG. 5.

FIG. 10 is a block diagram of an example processor platform 1000 structured to execute and/or instantiate the machine readable instructions and/or the operations of FIGS. 8A-C and/or 9 to implement the mobile container control circuitry 430 of FIG. 5. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example merchant/warehouse interface circuitry 500, the example inventory monitoring circuitry 502, the example order managing circuitry 504, the example container tracking circuitry 506, the example destination determining circuitry 508, and the example security monitoring circuitry 510.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1032, which may be implemented by the machine readable instructions of FIGS. 8A-C and/or 9, may be stored in the mass storage device 1028, in the volatile memory 1014, in the non-volatile memory 1016, and/or on a removable non-transitory computer readable storage medium such as a CD or DVD.

Figure 11:
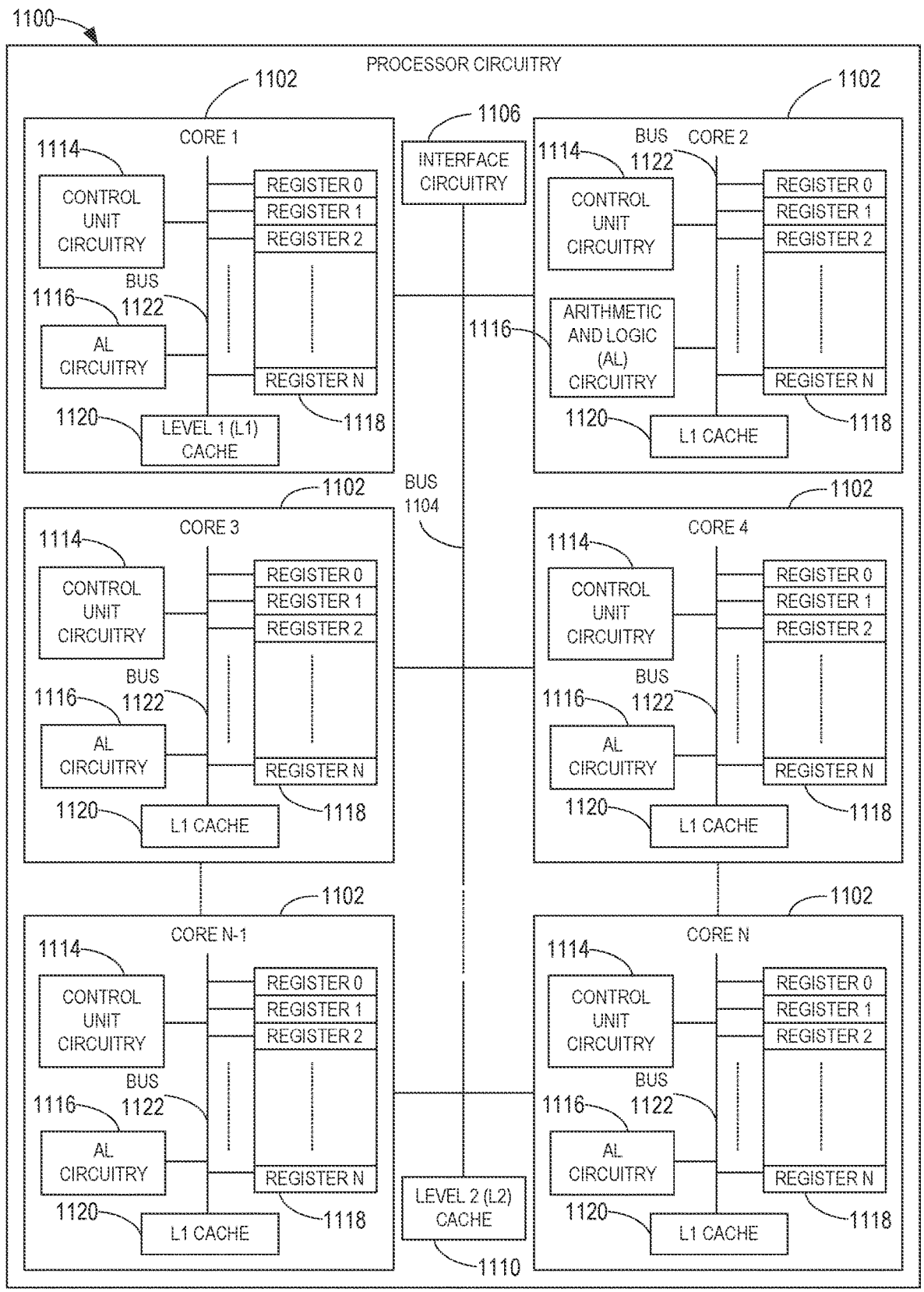
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a general purpose microprocessor 1100. The general purpose microprocessor circuitry 1100 executes some or all of the machine readable instructions of the flowcharts of FIGS. 8A-C and/or 9 to effectively instantiate the circuitry of FIG. 5 as logic circuits to perform the operations corresponding to those machine readable instructions. In some such examples, the circuitry of FIG. 5 is instantiated by the hardware circuits of the microprocessor 1100 in combination with the instructions. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 8A-C and/or 9.

The cores 1102 may communicate by a first example bus 1104. In some examples, the first bus 1104 may implement a communication bus to effectuate communication associated with one(s) of the cores 1102. For example, the first bus 114 may implement at least one of an Inter-Integrated Circuit (I2C) bus, a Serial Peripheral Interface (SPI) bus, a PCI bus, or a PCIe bus. Additionally or alternatively, the first bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_ cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
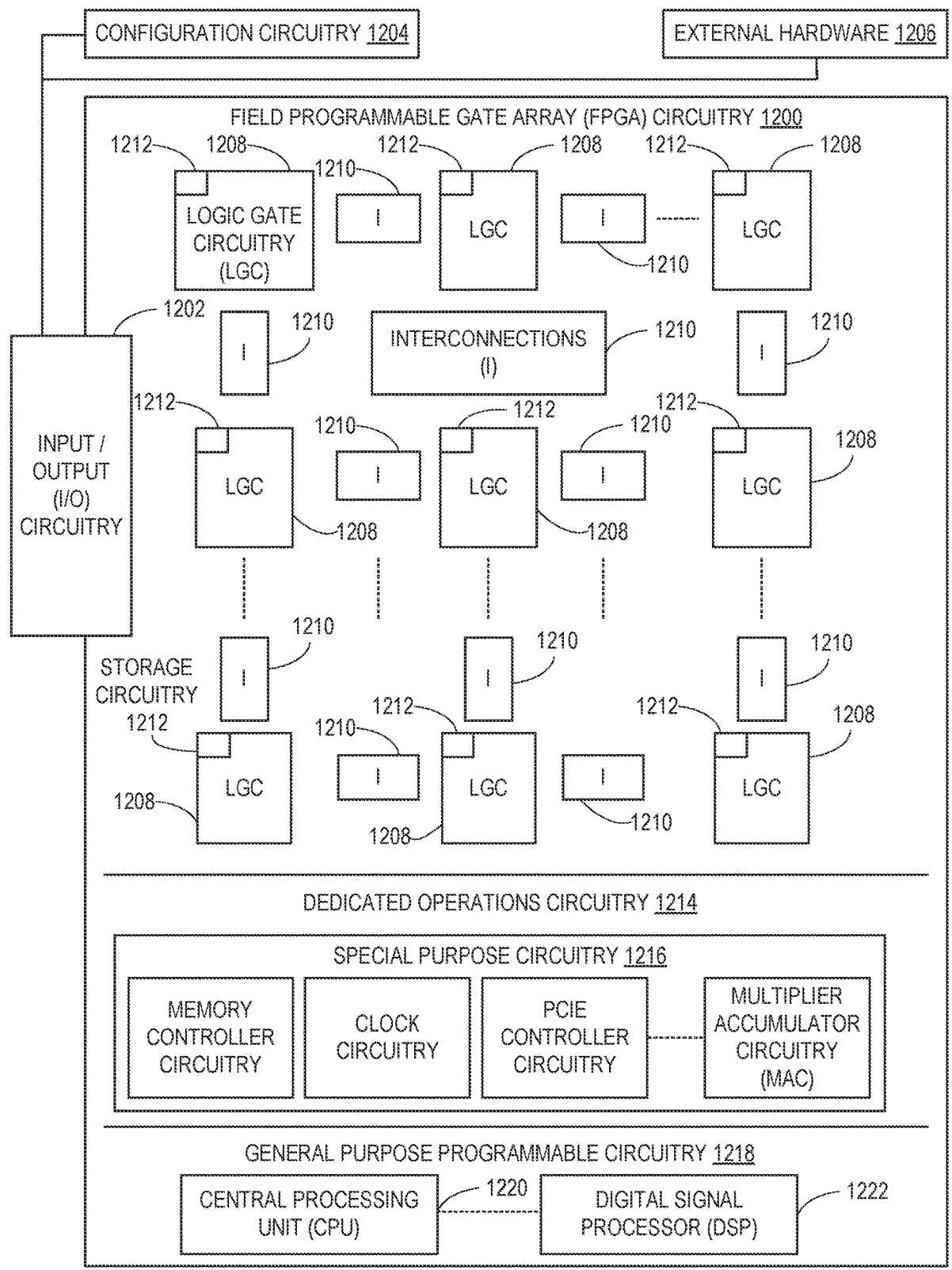
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 8A-C and/or 9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 8A-C and/or 9. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 8A-C and/or 9. As such, the FPGA circuitry 1200 may be structured to effectively instantiate some or all of the machine readable instructions of the flowcharts of FIGS. 8A-C and/or 9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 8A-C and/or 9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 8A-C and/or 9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 8A-C and/or 9 may be executed by one or more of the cores 1102 of FIG. 11, a second portion of the machine readable instructions represented by the flowcharts of FIGS. 8A-C and/or 9 may be executed by the FPGA circuitry 1200 of FIG. 12, and/or a third portion of the machine readable instructions represented by the flowcharts of FIGS. 8A-C and/or 9 may be executed by an ASIC. It should be understood that some or all of the circuitry of FIG. 12 may, thus, be instantiated at the same or different times. Some or all of the circuitry may be instantiated, for example, in one or more threads executing concurrently and/or in series. Moreover, in some examples, some or all of the circuitry of FIG. 5 may be implemented within one or more virtual machines and/or containers executing on the microprocessor.

In some examples, the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
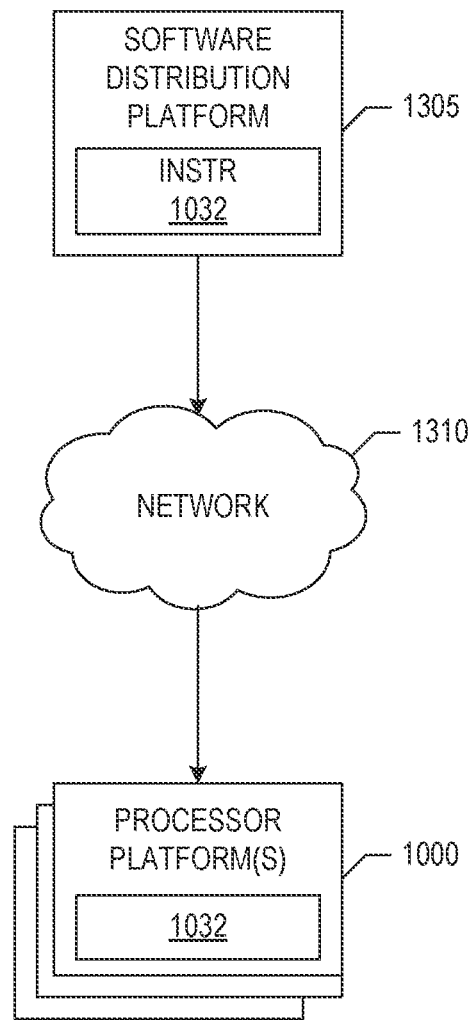
FIG. 13 is a block diagram of an example software distribution platform (e.g., one or more servers) to distribute software (e.g., software corresponding to the example machine readable instructions of FIGS. 8A-C and/or 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 800, 820 of FIGS. 8A-C and/or 9, as described above. The one or more servers of the example software distribution platform 1305 are in communication with a network 1310, which may correspond to any one or more of the Internet and/or any of the example networks 1026 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 800, 820 of FIGS. 8A-C and/or 9, may be downloaded to the example processor platform 400, which is to execute the machine readable instructions 1032 to implement the mobile container control circuitry 430. In some example, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that provide for dynamic management of mobile fulfillment container(s) in an environment (e.g., a city, a neighborhood) to enable user(s) to retrieve good(s) from the container(s) to fulfill order(s) for the good(s). Examples disclosed herein monitor inventory in the mobile fulfillment container(s) and associate order(s) (e.g., online order(s)) with the container(s) including inventory to satisfy the order(s). Example disclosed herein identify a retrieval destination for the container(s), where the order(s) can be fulfilled or retrieved by the user(s). Some examples disclosed herein execute optimization model(s) to identify a retrieval destination that minimizes a distance between, for instance, the mobile fulfillment container and the location(s) of user(s) who placed order(s) to be retrieved from the container. Examples disclosed herein dynamically respond to changes in inventory in the mobile fulfillment container (s), orders received, user location(s), user interaction(s) with the inventory, etc. to manage the container(s) in an environment.

Example apparatus, systems, methods, and articles of manufacture for mobile fulfillment containers are disclosed herein. Further examples and combinations thereof include the following:

Example 1 includes a mobile container comprising a storage area, the storage area to move between a locked state and an unlocked state to provide access to inventory in the storage area; an electronic gating sensor to detect when the inventory has been removed from the storage area; and processor circuitry to output an instruction including a destination for the mobile container based on an order associated with the inventory.

Example 2 includes the mobile container of example 1, wherein the storage area includes one or more storage units, the one or more storage units including respective doors to provide access to the inventory.

Example 3 includes the mobile container of examples 1 or 2, further including a camera to generate image data including the storage area.

Example 4 includes the mobile container of any of examples 1-3, further including a display screen, the processor circuitry to cause the storage area to move from the locked state to the unlocked state based on a user input received via the display screen.

Example 5 includes the mobile container of any of examples 1-4, further including a robotic arm to retrieve the inventory in the storage area when the storage area is in the unlocked state, the robotic arm to deliver the inventory to an area of the mobile container different than the storage area.

Example 6 includes the mobile container of any of examples 1-5, wherein the electronic gating sensor includes a radio frequency identification reader.

Example 7 includes the mobile container of any of examples 1-6, further including a motor.

Example 8 includes the mobile container of any of examples 1-7, further including wheels, wherein the mobile container is an autonomous vehicle.

Example 9 includes an apparatus comprising memory; instructions; and processor circuitry to execute the instructions to associate a first order with a first mobile container based on goods stored in the first mobile container; select a first retrieval destination based on a current location of the first mobile container and a location associated with the first order; and output a first instruction including the first retrieval destination for the first mobile container.

Example 10 includes the apparatus of example 9, wherein the processor circuitry is to further select the first retrieval destination based on a location associated with a second order, the second order associated with the first mobile container.

Example 11 includes the apparatus of examples 9 or 10, wherein the processor circuitry is to further select the first retrieval destination based on a location of a second mobile container.

Example 12 includes the apparatus of any of examples 9-11, wherein the processor circuitry is to determine a route for the first mobile container to travel to the first retrieval destination.

Example 13 includes the apparatus of any of examples 9-12, wherein the processor circuitry is to determine a length of time for the first mobile container to remain at the first retrieval destination based on a number of orders associated with the first mobile container.

Example 14 includes the apparatus of any of examples 9-13, wherein the processor circuitry is to cause the first mobile container to leave the first retrieval destination after a threshold period of time.

Example 15 includes the apparatus of any of examples 9-14, wherein the processor circuitry is to associate a second order with the first mobile container; select a second retrieval destination for the first mobile container based on the location associated with the first order and a location associated with the second order; and output a second instruction including the second retrieval destination for the first mobile container.

Example 16 includes the apparatus of any of examples 9-15, wherein the processor circuitry is to cause a second mobile container to move to the first retrieval destination responsive to the first mobile container traveling to the second retrieval destination.

Example 17 includes the apparatus of any of examples 9-16, wherein the first order is associated with a first good stored in the first mobile container and the processor circuitry is to detect access by a user to a second good stored in the first mobile container, the second good not associated with the first order; and one or more of (a) cause an alert to be output via the first mobile container responsive to the detection of the access to the second good or (b) initiate a purchase of the second good responsive to the detection of the access to the second good.

Example 18 includes the apparatus of any of examples 9-17, wherein the processor circuitry is to execute an optimization model to select the first retrieval destination, the optimization model to select the first retrieval destination based on a minimal distance between the first mobile container and the location associated with the first order.

Example 19 includes a system comprising a first mobile container to store first inventory; a second mobile container to store second inventory; and processor circuitry to identify one or more of the first mobile container or the second mobile container as capable of fulfilling an order for goods; select one of the first mobile container or the second mobile container to fulfill the order; determine a destination for the selected one of the first mobile container or the second mobile container based on the order; output an instruction including the destination; and provide access to at least a portion of the first inventory or the second inventory of the selected one of one of the first mobile container or the second mobile container when the selected one of the first mobile container or the second mobile container is at the destination.

Example 20 includes the system of example 19, wherein the processor circuitry is to select the first mobile container or the second mobile container to fulfill the order based on one or more of a location of the first mobile container; a location of the second mobile container; a location of a user associated with the order; a level of the first inventory in the first mobile container; or a level of the second inventory in the second mobile container.

Example 21 includes the system of examples 19 or 20, wherein the order is a first order, the destination is a first destination, and the processor circuitry is to associate a second order with the selected one of the first mobile container or the second mobile container; and determine a second destination for the selected one of the first mobile container or the second mobile container based on the first order and the second order.

Example 22 includes the system of any of examples 19-21, wherein the processor circuitry is to output an instruction including the second destination for the selected one of the first mobile container or the second mobile container; and output an instruction including the first destination for the other of the first mobile container or the second mobile container responsive to the determination of the second destination for the selected one of the first mobile container or the second mobile container.

Example 23 includes the system of any of examples 19-22, wherein the processor circuitry is to provide access to at least the portion of the first inventory or the second inventory of the selected one of one of the first mobile container or the second mobile container by authenticating a user associated with the order; and instructing at least a portion of a storage area of the selected one of the first mobile container or the second mobile container to move from a locked state to an unlocked state responsive to the authentication of the user.

Example 24 includes the system of any of examples 19-23, wherein the processor circuitry is to identify a good removed from the first inventory or the second inventory of the selected one of the first mobile container or the second mobile container; determine if the good is associated with the order; responsive to determining that the good is associated with the order, identify the order as fulfilled; and responsive to determining that good is not associated with the order, cause a payment transaction to be initiated for the good.

Example 25 includes the system of any of examples 19-24, wherein one or more of the first mobile container or the second mobile container is an autonomous vehicle.

Example 26 includes at least one non-transitory computer readable medium comprising instructions which, when executed, cause one or more processors to at least select a first mobile container based a first order, the first order corresponding to inventory stored in the first mobile container; determine a destination for the first mobile container based on a current location of the first mobile container and a location associated with the first order; output a first instruction including the destination for the first mobile container; update the destination responsive to a second order, the second order corresponding to inventory stored in the first mobile container; and output a second instruction including the updated destination for the first mobile container.

Example 27 includes the at least one-transitory computer readable medium of example 26, wherein the instructions, when executed, cause the one or more processors to determine the updated destination based on a distance between the location associated with the first order and a location associated with the second order.

Example 28 includes the at least one-transitory computer readable medium of examples 26 or 27, wherein the updated destination includes a first destination and a second destination, the first destination different than the second destination.

Example 29 includes the at least one-transitory computer readable medium of any of example 26-28, wherein the instructions, when executed, further cause the one or more processors to determine a first route for the first mobile container to travel for the destination and a second route for the first mobile container to travel for the updated destination.

Example 30 includes the at least one-transitory computer readable medium of any of example 26-30, wherein the instructions, when executed, further cause the one or more processors to determine a length of time for the first mobile container to remain at the updated destination based on a level of the inventory in the first mobile container.

Example 31 includes a method comprising associating, by executing an instruction with at least one processor, a first order with a first mobile container based on goods stored in the first mobile container; selecting, by executing an instruction with the at least one processor, a first retrieval destination based on a current location of the first mobile container and a location associated with the first order; and outputting, by executing an instruction with the at least one processor, a first instruction including the first retrieval destination for the first mobile container.

Example 32 includes the method of example 31, further including selecting the first retrieval destination based on a location associated with a second order, the second order associated with the first mobile container.

Example 33 includes the method of examples 31 or 32, further including determining a length of time for the first mobile container to remain at the first retrieval destination based on a number of orders associated with the first mobile container.

Example 34 includes the method of any of example 31-33, further including associating a second order with the first mobile container; selecting a second retrieval destination for the first mobile container based on the location associated with the first order and a location associated with the second order; and outputting a second instruction including the second retrieval destination for the first mobile container.

Example 35 includes the method of any of example 31-34, wherein the first order is associated with a first good stored in the first mobile container and further including detecting access by a user to a second good stored in the first mobile container, the second good not associated with the first order; and initiating a purchase of the second good responsive to the detection of the access to the second good.

Example 36 includes a method comprising receiving an order for a portion of inventory carried by a mobile container, the mobile container at a first destination, the order associated with a second destination, the second destination different than the first destination; performing a comparison between the first destination and the second destination; outputting an instruction including a selected destination for the mobile container based on the comparison, the selected destination including one of the first destination, the second destination, or a third destination, the third destination different than the first destination and the second destination; and providing access to the portion of the inventory in the mobile container when the mobile container is at the selected destination and responsive to a user input associated with the order.

Example 37 includes the method of example 36, further including detecting the user input via a display screen of the mobile container.

Example 38 includes the method of examples 36 or 37, further including detecting removal of the portion of the inventory from the mobile container based on an identifier associated with the portion of the inventory.

Example 39 includes the method of any of example 36-38, wherein the portion of the inventory is a first portion of the inventory and further including detecting removal of the first portion inventory from the mobile container; detecting removal of a second portion of the inventory from the mobile container; and generating an alert responsive to removal of the second portion of the inventory portion of the inventory and not the first portion of the inventory.

Example 40 includes the method of any of example 36-40, wherein providing access to the portion of inventory of the mobile container includes selectively providing access to a first area of the mobile container or a second area of the mobile container based on a location of the portion of the inventory in the mobile container.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A mobile container comprising:
   a storage area, the storage area to move between a locked state and an unlocked state to provide access to inventory in the storage area;
   an electronic gating sensor to detect when a good of the inventory has been removed from the storage area;
   machine-readable instructions; and
   at least one processor circuit to be programmed by the machine-readable instructions to:
      output an instruction including a destination for the mobile container based on an order associated with the inventory;
      provide access to the inventory when the mobile container is at the destination;
      identify, responsive to outputs of the electronic gating sensor, the good removed from the storage area;
      determine if the good is associated with the order;
      responsive to determining that the good is associated with the order, update a fulfillment status for the order; and
      responsive to determining that the good is not associated with the order, cause an alert to be output; and
      after output of the alert, cause an automatic payment transaction to be initiated for the good.

2. The mobile container of claim 1, wherein the storage area includes one or more storage units, the one or more storage units including respective doors to provide access to the inventory.

3. The mobile container of claim 1, further including a camera to generate image data including the storage area.

4. The mobile container of claim 1, further including a display screen, one or more of the at least one processor circuit to cause the storage area to move from the locked state to the unlocked state based on a user input received via the display screen.

5. The mobile container of claim 1, further including a robotic arm to retrieve the inventory in the storage area when the storage area is in the unlocked state, the robotic arm to deliver the inventory to an area of the mobile container different than the storage area.

6. The mobile container of claim 1, wherein the electronic gating sensor includes a radio frequency identification reader.

7. The mobile container of claim 1, further including a motor.

8. The mobile container of claim 7, further including wheels, wherein the mobile container is an autonomous vehicle.

9. A system comprising:
   a first mobile container to store first inventory;
   a second mobile container to store second inventory;
   machine-readable instructions; and
   at least one processor circuit to be programmed by the machine-readable instructions to:
      identify one or more of the first mobile container or the second mobile container as capable of fulfilling an order for goods;
      select one of the first mobile container or the second mobile container to fulfill the order;
      determine a destination for the selected one of the first mobile container or the second mobile container based on the order;
      output an instruction including the destination;
      provide access to at least a portion of the first inventory or the second inventory of the selected one of one of the first mobile container or the second mobile container when the selected one of the first mobile container or the second mobile container is at the destination;
      identify a good removed from the first inventory or the second inventory of the selected one of the first mobile container or the second mobile container;
      determine if the good is associated with the order;
      responsive to determining that the good is associated with the order, update a fulfillment status for the order; and
      responsive to determining that the good is not associated with the order, cause an alert to be output; and
      after output of the alert, cause an automatic payment transaction to be initiated for the good.

10. The system of claim 9, wherein one or more of the at least one processor circuit is to select the first mobile container or the second mobile container to fulfill the order based on one or more of a location of the first mobile container; a location of the second mobile container; a location of a user associated with the order; a level of the first inventory in the first mobile container; or a level of the second inventory in the second mobile container.

11. The system of claim 9, wherein the order is a first order, the destination is a first destination, and one or more of the at least one processor circuit is to:
associate a second order with the selected one of the first mobile container or the second mobile container; and
determine a second destination for the selected one of the first mobile container or the second mobile container based on the first order and the second order.

12. The system of claim 11, wherein one or more of the at least one processor circuit is to:
output an instruction including the second destination for the selected one of the first mobile container or the second mobile container; and
output an instruction including the first destination for the other of the first mobile container or the second mobile container responsive to the determination of the second destination for the selected one of the first mobile container or the second mobile container.

13. The system of claim 9, wherein one or more of the at least one processor circuit is to provide access to at least the portion of the first inventory or the second inventory of the selected one of one of the first mobile container or the second mobile container by:
authenticating a user associated with the order; and
instructing at least a portion of a storage area of the selected one of the first mobile container or the second mobile container to move from a locked state to an unlocked state responsive to the authentication of the user.

14. The system of claim 13, wherein the good is a first good, the automatic payment transaction is a first automatic payment transaction, and one or more of the at least one processor circuit is to:
identify a second good removed from the first inventory or the second inventory of the selected one of the first mobile container or the second mobile container;
determine if the second good is associated with the order;
responsive to determining that the second good is associated with the order, identify the order as fulfilled; and
responsive to determining that the second good is not associated with the order, cause a second automatic payment transaction to be initiated for the second good.

15. The system of claim 9, wherein one or more of the first mobile container or the second mobile container is an autonomous vehicle.

16. A method comprising:
identifying one or more of a first mobile container or a second mobile container as capable of fulfilling an order for goods, the first mobile container storing first inventory and the second mobile container storing second inventory;
selecting one of the first mobile container or the second mobile container to fulfill the order;
determining, by at least one processor circuit programmed by at least one instruction, a destination for the selected one of the first mobile container or the second mobile container based on the order;
outputting an instruction including the destination;
providing, by one or more of the at least one processor circuit, access to at least a portion of the first inventory or the second inventory of the selected one of one of the first mobile container or the second mobile container when the selected one of the first mobile container or the second mobile container is at the destination;

identifying a good removed from the first inventory or the second inventory of the selected one of the first mobile container or the second mobile container; and
performing action based on whether the good is associated with the order, (a) wherein a fulfillment status for the order is updated if the good is associated with the order, and (b) wherein an alert is caused to be output and after output of the alert, an automatic payment transaction is caused to be initiated for the good if the good is not associated with the order.

17. The method of claim 16, wherein selecting of the first mobile container or the second mobile container to fulfill the order is based on one or more of a location of the first mobile container; a location of the second mobile container; a location of a user associated with the order; a level of the first inventory in the first mobile container; or a level of the second inventory in the second mobile container.

18. The method of claim 16, wherein the order is a first order, the destination is a first destination, and further including:
associating a second order with the selected one of the first mobile container or the second mobile container; and
determining a second destination for the selected one of the first mobile container or the second mobile container based on the first order and the second order.

19. The method of claim 16, wherein providing access to at least the portion of the first inventory or the second inventory of the selected one of one of the first mobile container or the second mobile container includes:
authenticating a user associated with the order; and
instructing at least a portion of a storage area of the selected one of the first mobile container or the second mobile container to move from a locked state to an unlocked state responsive to the authentication of the user.

20. The method of claim 19, wherein the good is a first good and the automatic payment transaction is a first automatic payment transaction, the method further including:
identifying a second good removed from the first inventory or the second inventory of the selected one of the first mobile container or the second mobile container;
determining if the second good is associated with the order;
responsive to determining that the second good is associated with the order, identifying the order as fulfilled; and
responsive to determining that the second good is not associated with the order, causing a second automatic payment transaction to be initiated for the second good.

21. The system of claim 9, wherein responsive to determining that the good is not associated with the order, one or more of the at least one processor circuit is to:
after output of the alert, determine that the good has been removed from the first inventory or the second inventory of the selected one of the first mobile container or the second mobile container for a threshold period of time; and
cause the automatic payment transaction to be initiated after the threshold period of time.

22. The system of claim 9, wherein the selected one of the first mobile container or the second mobile container includes an image sensor and one or more of the at least one processor circuit is to, responsive to determining that the good is not associated with the order, cause the image sensor to generate outputs corresponding to image data of an environment including the selected one of the first mobile container or the second mobile container.

* * * * *